United States Patent
Taguchi et al.

(10) Patent No.: US 6,248,418 B1
(45) Date of Patent: Jun. 19, 2001

(54) POLYESTER PRODUCT AND PROCESS FOR PRODUCING THE SAME

(75) Inventors: Setsuo Taguchi, Shiga; Miyoshi Okamoto, Osaka; Yukihiro Maeda, Shiga, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 08/716,244

(22) PCT Filed: Jan. 24, 1996

(86) PCT No.: PCT/JP96/00120

§ 371 Date: Nov. 7, 1996

§ 102(e) Date: Nov. 7, 1996

(87) PCT Pub. No.: WO96/22876

PCT Pub. Date: Aug. 1, 1996

(30) Foreign Application Priority Data

Jan. 24, 1995 (JP) ................................... 7-009166
Feb. 17, 1995 (JP) ................................... 7-029161
Apr. 10, 1995 (JP) ................................... 7-083966
May 10, 1995 (JP) ................................... 7-112126

(51) Int. Cl.$^7$ ........................................ D02G 3/22
(52) U.S. Cl. ................. 428/85; 428/359; 442/400; 442/409; 442/414; 442/181; 2/272; 2/268; 2/171; 280/728.1; 264/211.22
(58) Field of Search .................. 442/400, 409, 442/414, 181; 2/272, 268, 171; 428/85, 359; 280/728.1; 264/211.22

(56) References Cited

U.S. PATENT DOCUMENTS 2,952,879 9/1960 Kitson et al. .
3,091,510 5/1963 McCord et al. .

FOREIGN PATENT DOCUMENTS

| 48-11432 | 2/1973 | (JP) . |
| 51-105476 | 9/1976 | (JP) . |
| 52-5319 | 5/1977 | (JP) . |
| 53-52722 | 5/1978 | (JP) . |
| 6-2149912 | 3/1987 | (JP) . |
| 6-2090315 | 4/1987 | (JP) . |
| 62-49378 | 10/1987 | (JP) . |
| 6-146111 | 5/1994 | (JP) . |
| 60-231814 | 11/1995 | (JP) . |
| WO 94/28047 | 12/1994 | (WO) . |

*Primary Examiner*—Elizabeth M. Cole
(74) *Attorney, Agent, or Firm*—Austin R. Miller

(57) ABSTRACT

The present invention relates to a polyester product excellent in resilient elasticity, shape retainability and shape stability, and a process for producing the same.

The invention provides a polyester product with high resilient elasticity, shape retainability, and shape stability, which is produced by heat-treating a product comprising polyester fibers or a film prepared by taking up a molten polyester at a take-up speed of 2000 m/min to 4000 m/min, in wet heat and/or dry heat at not lower than 120° C. with the product maintained in a loose or constrained condition without being drawn.

The product is very suitable, for example, as a collar interlining cloth of a shirt, a base fabric of a shirt, or a fabric of a lady's dress, etc.

33 Claims, 5 Drawing Sheets

POLYESTER PRODUCT AND PROCESS FOR PRODUCING THE SAME

TECHNICAL FIELD

The present invention relates to a polyester product excellent in shape stability, etc. and a process for producing the same. Furthermore, the present invention relates to interlinings and pads using polyester fibers with good resilient elasticity and shape stability, or polyester fibers with resiliency and shape retainability, and also to clothes and various applied products using them.

BACKGROUND ART

Since they have high performance, synthetic fibers such as nylon and polyester fibers have been used widely for clothing and in industrial areas. Fibrous sheets composed of nylons and polyesters are used frequently as three-dimensional products such as interlining cloths for clothes, brassieres, and pads for breasts and shoulders. Furthermore, recently, it has been the practice to stabilize the shape of the shirts composed of blended yarns consisting of a polyester and cotton.

On the one hand, nylons are very poor in dimensional stability in dry and wet conditions because hey expand when absorbing water, and contract when dried, and cannot be used in areas where dimensional stability is important. So, in recent years, as fibers for clothes, nylon fibers are mostly being replaced by polyesters.

On the other hand, polyesters are disadvantageously weak in resilient elasticity and liable to yield to repeated bending, even though good in dimensional stability in dry and wet conditions. For this reason, even though they are lower in cost than nylon 6 and nylon 66, they are little used for such applications as toothbrushes, artificial lawns, carpets, etc.

Japanese Laid-Open Patent Application (Kokai) No. 2-289101 (1990) discloses an interlining cloth using conjugate fibers having spiral crimps. Japanese Laid-Open Patent Application (Kokai) No. 3-130434 (1991) discloses an interlining cloth formed by a knitted/woven fabric using yarns having loops and fluffs. Japanese Laid-Open Patent Application (Kokai) No. 3-152203 (1991) discloses a bonded interlining cloth using crimped yarns.

However, the conventional polyester fibers are poor in resiliency, and for such applications as interlining cloths where good resiliency is required, they must be, for example, used in conjugation with highly resilient animal hair such as horse hair or human hair. Furthermore, since interlining cloths higher in resiliency can be less adapted to the forms of clothing, then disadvantageously a sophisticated sewing technique is required.

DISCLOSURE OF THE INVENTION

It is difficult to obtain materials composed of fibers good in both resiliency and dimensional stability and excellent in shape stability, using the conventional fibers. More especially, it is more difficult to obtain three-dimensional materials composed of fibers.

For example, interlining cloths for dresses are three-dimensionally shaped to have curved surfaces by overlapping many fiber sheets (which, when produced are flat), to retain the shape of the clothing and to beautifully express body lines. However, the sewing work is complicated, and since the fibers memorize their original shapes, forcibly deformed fibers return to their original shapes with the lapse of time, making it difficult to achieve durable shaping. This appears as deformation of products, to lower greatly the grade. As a feature of interlining cloth, even though the yarns with conventional properties can be used in the vertical direction, surfaces curved to protrude outwardly are required in the horizontal direction.

On the other hand, recently it has often been the practice to crosslink or modify cellulose, for improving the shape stability of shirts, but these products have problems in that, for example, the chemical compounds used for shape stabilization remain (formalin in particular is not suitable for clothes to be kept in contact with the skin), the strength is lower, and the effect of shape stabilization is small.

The object of the present invention is to overcome the above disadvantages, to provide a polyester product good in both resilient elasticity and dimensional stability and excellent in shape retainability, and a process for producing the same.

An embodiment of the process for producing the polyester product of the present invention is a process is for producing a polyester product comprising; heat-treating a product comprising polyester fibers or a polyester film prepared by taking up a molten polyester at a take-up speed of 2000 m/min to 4000 m/min, in wet heat and/or dry heat at not lower than 120° C. with the product maintained in a loose or constrained condition without being drawn.

Another embodiment of the process for producing the polyester product of the present invention is a process for preparing a polyester product comprising: heat-treating a product comprising polyester fibers or a polyester film prepared by taking up a molten polyester at a take-up speed of 2000 m/min to 4000 m/min, in wet heat and/or dry heat at 60° C. to 120° C. with the product maintained in a loose or constrained condition without being drawn, as a first step, and further heat-treating the product in wet heat and/or dry heat at a temperature not less than the treatment temperature of the first step and not more than the melting point of the polyester, as a second step.

A still further embodiment of the process for preparing the polyester product of the present invention is a process for preparing a polyester product comprising: heat-treating in wet heat and/or dry heat at not lower than 120° C. a product comprising polyester fibers which have a yield point and a natural draw range to allow the polyester fibers to be elongated at a stress within a range lower than the stress of the yield point, on the stress-strain curve prepared by measuring the tensile strengths and elongations of the polyester fibers, and which are less than 100% in elongation from the yield point to the end point of the natural draw range.

Yet another embodiment of the process for preparing the polyester product of the present invention is a process for preparing a polyester product comprising: heat-treating at least in two steps a product comprising polyester fibers which have a yield point and a natural draw range such as to allow the polyester fibers to be elongated at a stress within a range lower than the stress of the yield point, on the stress-strain curve prepared by measuring the tensile strengths and elongations of the polyester fibers, and which are less than 100% in elongation from the yield point to the end point of the natural draw range, with the heat-treating in the latter step being performed in wet heat and/or dry heat at a temperature higher than the temperature of the first step and lower than the melting point of the polyester, and yet higher than 120° C.

An embodiment of the molded polyester product of the present invention is a molded polyester product is such as a polyester fiber or a polyester film, which comprises a layer-line 4-point pattern in the scattering image obtained by small-angle X-ray scattering photography, is of 8 nm to 15 nm in the Dm value (one unit period of crystal lattice/non-crystal lattice in the fiber axis direction) of the long period determined from said photo, and 20 nm to 35 nm in the De value (one unit period of crystal lattice/non-crystal lattice in the cross-sectional direction of the fiber), and further satisfies the following conditions (1) to (5):

(1) 1.350 to 1.385 in specific gravity,
(2) 2.0 nm to 4.0 nm at Miller index (010), 2.3 nm to 4.0 nm at Miller index (100), and 1.5 nm to 4.2 nm at Miller index ($\overline{1}$05), as crystal sizes obtained by wide-angle X-ray diffraction measurement,
(3) 58% to 85% in the degree of crystal orientation obtained by wide-angle X-ray diffraction measurement,
(4) 0.088 to 0.450 in the amorphous orientation by polarized fluorescence method,
(5) $50 \times 10^{-3}$ to $120 \times 10^{-3}$ in birefringence.

Another embodiment of the molded polyester product of the present invention is a molded polyester product such as a polyester fiber or a polyester film, which comprises a 2-point image in the scattering image obtained by small-angle X-ray scattering photography, is of 15 nm or less in the J value obtained from the following equation, where r is the distance from the meridian or equator to the center of the scattering image on said photo, and further satisfies the above conditions (1) to (4);

$$J=\lambda/2 \sin [\{\tan^{-1}(r/R)\}/2]$$

where R: radius of camera, $\lambda$: wavelength of X ray, J: long period.

Yet another embodiment of the molded polyester product of the present invention is a molded polyester product such as a polyester fiber or a polyester film, which comprises a layer-line 4-point pattern in the scattering image obtained by small-angle X-ray scattering photography, is of less than 14 nm in the Dm value (one unit period of crystal lattice/non-crystal lattice in the fiber axis direction) of the long period determined from said photo, 18 nm or more in the De value (one unit period of crystal lattice/non-crystal lattice in the cross-sectional direction of the fiber), and less than 1.0 in Dm/De, and further satisfies the above conditions (1) to (5).

An embodiment of the fiber of the present invention is a fiber material obtained by uniting fibers by a combined mixing and twisting, mixing, conjugating, mix-texturing, mix-spinning or covering any polyester fiber of the above embodiments, and at least one kind of fiber selected from the group consisting of a fiber obtained by at least drawing a polyethylene terephthalate based fiber prepared by taking up a molten polyester at 2000 m/min to 4000 m/min, drawn polyethylene terephthalate based yarn, regenerated cellulose fiber, cotton, hemp, wool, acetate, polyamide fiber, aramid fiber, and silk.

An embodiment of the fibrous sheet of the present invention is a fibrous sheet formed of a woven fabric, knitted fabric, nonwoven fabric, paper-like sheet or net-like sheet of a fiber obtained by conjugating or mixing any polyester fiber of the above embodiments, and at least one kind of fiber selected from the group consisting of a fiber obtained by at least drawing a polyethylene terephthalate based fiber prepared by taking up a molten polyester at 2000 m/min to 4000 m/min, drawn polyethylene terephthalate based yarn, regenerated cellulose fiber, cotton, hemp, wool, animal hair, acetate, polyamide fiber, acrylic fiber, polyurethane fiber, aramid fiber, and silk.

An embodiment of fiber material of the present invention is a fiber material comprising any polyester fiber of the above embodiments.

An embodiment of interlining cloth of the present invention is an interlining cloth comprising a woven fabric or knitted fabric formed by using a fiber comprising any polyester fiber of the above embodiments, in which the fiber comprising the polyester fiber has a twist count of 800 T/m or less.

An embodiment of a pad of the present invention is a pad comprising a woven fabric or knitted fabric formed by using a fiber comprising any polyester fiber of the above embodiments, in which the fiber comprising the polyester fiber has a twist count of 800 T/m or less.

An embodiment of a shoulder pad of the present invention is a shoulder pad produced by heat-treating at not lower than 120° C. a shoulder pad comprising polyester fibers spun at 2000 m/min to 4000 m/min and not drawn, with a base fabric cover around the shoulder pad, and/or the fabric inside the shoulder pad being maintained in a certain shape to form an outward protrusion.

An embodiment of collar interlining cloth of the present invention is a collar interlining cloth produced by forming a collar interlining cloth comprising polyester fibers spun at 2000 m/min to 4000 m/min and not drawn, serving as weft (or warp), and other fibers serving as warp (or weft), and heat-treating it at not lower than 120° C., while maintaining it in a certain shape to form an outward protrusion, after having shaped it to form a surface curved to form is a protrusion in one direction.

Another embodiment of interlining cloth of the present invention is an interlining cloth produced by forming a interlining cloth comprising polyester fibers spun at 2000 m/min to 4000 m/min and not drawn, and heat-treating it at not lower than 120° C., while maintaining it in a curved shape to form a protrusion in one direction.

Another embodiment of inner component of a belt of the present invention is an inside belt produced by forming an inner compound of a belt comprising polyester fibers spun at 2000 m/min to 4000 m/min and not drawn, and heat-treating it at not lower than 120° C., while maintaining it in a shape such as to provide a surface curved to form a protrusion in one direction.

Yet another embodiment of interlining cloth of the present invention is an interlining cloth produced by forming an interlining cloth comprising polyester fibers spun at 2000 m/min to 4000 m/min, not drawn and not subjected to a thermal history of not lower than the second order transition temperature, as weft, and using other fibers as warp, and heat-treating it at not lower than 120° C., while maintaining it in a certain shape to form an outward protrusion, after having shaped it to provide a surface curved to form a is protrusion in a horizontal direction.

An embodiment of crease-processed fabric of the present invention is a crease-processed fabric produced by crease-processing a woven fabric, knitted fabric or nonwoven fabric formed by at least partially using polyester fibers spun at 2000 m/min to 4000 m/min and not drawn, and heat-treating it at not lower than 120° C.

An embodiment of crimped fiber of the present invention is a crimped fiber produced by forming a crimped fiber by using only a polyester fiber spun at 2000 m/min to 4000 m/min and not drawn, or together with another fiber, and heat-treating it at not lower than 120° C.

Another embodiment of fiber of the present invention is a fiber produced by heat-treating only a polyester fiber spun at 2000 m/min to 4000 m/min and not drawn, or together with another fiber, at not lower than 120° C. in a constrained or loose condition without drawing, and then drawing it.

An embodiment of woven fabric of the present invention is a woven fabric produced by crimping only polyester fibers spun at 2000 m/min to 4000 m/min and not drawn, or together with other fibers, without drawing, subsequently cutting them into staple fibers, spinning them into yarns, weaving them into a fabric, and heat-treating it at not lower than 120° C. with the fabric maintained in a constrained or loose condition.

An embodiment of knitted fabric of the present invention is a knitted fabric produced by crimping only polyester fibers spun at 2000 m/min to 4000 m/min and not drawn, or together with other fibers, without drawing, subsequently cutting them into staple fibers, spinning them into yarns, weaving them into a fabric, and heat-treating it at not lower than 120° C. with the fabric maintained in a constrained or loose condition.

An embodiment of staple fiber of the present invention is a staple fiber produced by crimping only polyester fibers spun at 2000 m/min to 4000 m/min and not drawn, or together with other fibers, without drawing, subsequently cutting them into staple fibers.

An embodiment of shirt of the present invention is a shirt produced by weaving or knitting yarns made by spinning only said stable fiber or yarns made by mix-spinning said staple fiber and other fibers into a fabric, sewing it to form a shirt, and heat-treating it at not lower than 120° C.

An embodiment of headgear of the present invention is a headgear produced by forming a knitted fabric using only polyester fibers spun at 2000 m/min to 4000 m/min and not drawn, or together with other fibers, without drawing, forming it into a headgear, and then heat-treating it at not lower than 120° C.

An embodiment of headgear body of the present invention is a headgear body comprising said headgear.

An embodiment of carpet of the present invention is a carpet produced by crimping only polyester fibers spun at 2000 m/min to 4000 m/min and not subjected to a thermal history of not lower than second order transition point, or together with other fibers, without thermally drawing, forming them into a carpet, and then heat-treating it at not lower than 120° C.

An embodiment of air bag of the present invention is an air bag produced by forming an air bag using only polyester fibers spun at 2000 m/min to 4000 m/min and not drawn, or together with other fibers, without thermally drawing, and then heat-treating it at not lower than 120° C.

An embodiment of cord of the present invention is a cord produced by forming a woven fabric, knitted fabric, braid or nonwoven fabric using only polyester fibers spun at 2000 m/min to 4000 m/min and not drawn, or together with other fibers, cutting it into a cord, and then heat-treating it at not lower than 120° C., An embodiment of polyester conjugate fiber of the present invention is a polyester conjugate fiber which is taken up at 2000 m/min to 8000 m/min, is prepared by using polyethylene terephthalate, polybutylene terephthalate or a polyester copolymer thereof as a main component, and a polystyrene based polymer or a polyester polymer prepared by adding boric acid or a boron compound to polyethylene terephthalate, polystyrene terephthalate or a copolymer thereof as the other component, has a yield point and a natural draw range at which the fiber is capable of elongation at a stress within a range lower than the stress of the yield point on the stress-strain curve prepared by measuring the tensile strengths and elongations of the conjugate fiber, and is less than 100% in elongation from the yield point to the end point of the natural draw range.

An embodiment of polyester fiber of the present invention is a polyester fiber produced by removing the other component of said conjugate fiber, to leave the main component only.

The present invention gives the following effects.

(1) The polyester product provided is good in both resilient elasticity and dimensional stability and excellent in shape retainability.

(2) Especially a three-dimensionally shaped polyester product can be easily obtained, and its shape durability is good.

(3) Since chemical compounds are used less than in the conventional shape-retained products, no harmful chemical compound remains, and neither does the strength decline.

(4) If the polyester product is a fluff-raised fabric or brush, the raised fluffs have good bending resistance and are less liable to yield.

Figure 1:
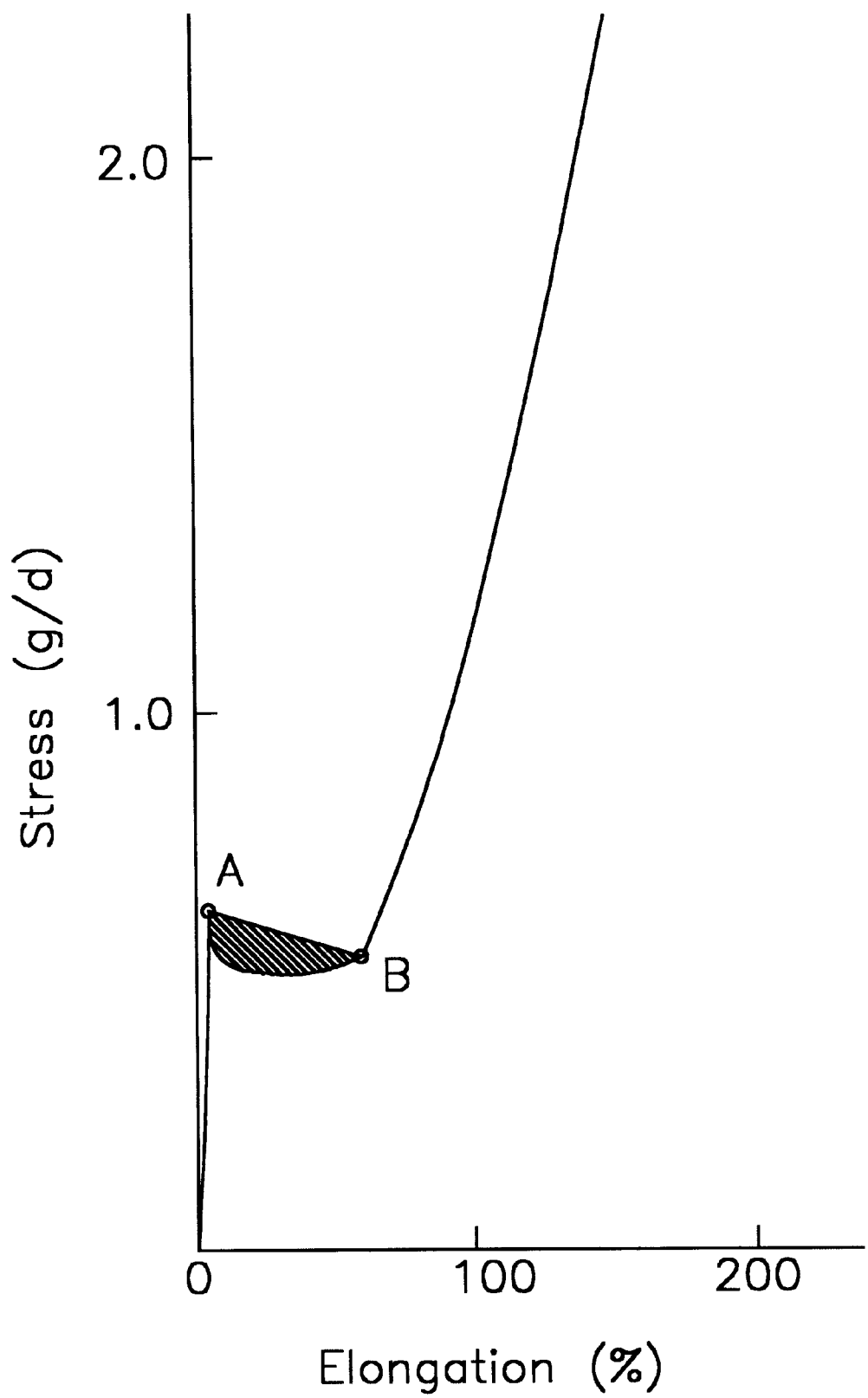
FIG. 1 shows the stress-strain curve of a polyester fiber in a first specified region.

In the drawings, the respective symbols mean the following.

A: yield point
B: end point of natural draw range

THE BEST MODE FOR CARRYING OUT THE INVENTION

In an embodiment of the present invention, a product comprising polyester fibers or a polyester film obtained by taking up a molten polyester at a take-up is speed of 2000 m/min to 4000 m/min is heat-treated in wet heat and/or dry heat at not lower than 120° C. with the product maintained in a loose or constrained condition without being drawn, to produce a polyester product good both in resilient elasticity and dimensional stability and excellent in shape retainability, As for the essence of the present invention, for example in melt spinning, at first a fiber is produced at a take-up speed of 2000 m/min to 4000 m/min (hereinafter this fiber is called a fiber in the first specified region), and the fiber in the first specified region is processed into an optional specific shape without the conventional heat treatment concurrent with false twisting or drawing, and then heated to a temperature to allow crystallization, to be crystallized and oriented, for making a fiber in a region different from the first specified region in the degree of crystallization and orientation (hereinafter this fiber is called a fiber in the second specified region). Thus, a polyester product good in both resilient elasticity and dimensional stability and excellent in shape retainability can be obtained.

To obtain a fiber or a film in the first specified region, a polyester is used. Especially an aromatic polyester such as polyethylene terephthalate or polybutylene terephthalate, or a copolymer mainly composed of it can be preferably used.

The molten polyester is taken up at a take-up speed of 2000 m/min to 4000 m/min. A preferable take-up speed range is 2500 m/min to 3500 m/min.

At a speed lower than 2000 m/min or higher than 4000 m/min, no fiber or film in the first specified region can be obtained.

On the other hand, the conventionally known fibers and films are obtained by thermally drawing the fibers and films obtained in said take-up speed range, and do not show the effects of the present intention. The present invention can be achieved when a polyester is used, and cannot be achieved if a nylon is used.

Such a polyester fiber or a polyester film in the first specified region is shaped into a desired polyester product, and fixed as an optional shape, and it is treated in an atmosphere of not lower than the second order transition temperature of the polyester, to produce a polyester fiber or a polyester film in the second specified region.

If a polyester fiber or a polyester film is shifted from the first specified region to the second specified region, it is high in elasticity and very good in bending resistance against repetitive bending like a nylon fiber, and also has dimensional stability in wet and dry conditions as an advantage peculiar to a polyester. That is, the polyester product of the present invention has an unprecedented epochal effect that both the advantages of a nylon and a polyester can be provided simultaneously.

The treatment for shifting from the first specified region to the second specified region can be achieved by treatment in an atmosphere of not lower than the second order transition temperature of the polyester, preferably 20° C. or more, more preferably 40° C. or more higher than the second order transition temperature. For example, in the case of polyethylene terephthalate, since its second order transition temperature is about 72° C., the treatment should be performed in an atmosphere preferably not lower than 92° C., more preferably not lower than 120° C., further more preferably not lower than 140° C. Therefore, the treatment temperature range is preferably 92 to 230° C., more preferably 120 to 230° C., further more preferably 140 to 230° C. The heating means can be either dry heat or wet heat, or both. Considering industrial productivity, treatment at a temperature not lower than 120° C. is preferable.

It is preferable for obtaining a product still better in resilient elasticity and shape stability, to heat-treat a product comprising polyester fibers or a is polyester film in wet heat and/or dry heat at 60° C. to 120° C. as the first step with the product maintained in a loose or constrained condition without drawing, and subsequently to heat-treat it in wet heat and/or dry heat at not lower than the treatment temperature of the first step and lower than the melting point of the polyester as the second step.

The fineness of the polyester fibers used in the present invention is not especially limited, but in general, it is preferable to use them as a yarn of 0.1 to 200 deniers in single fiber fineness and 20 to 1000 deniers in total fineness.

From the viewpoint of obtaining high strength, high elasticity and shrink resistance, the intrinsic viscosity of the polyester (in orthochlorophenol at 30° C.) is preferably 0.55 to 1.00.

For easy dyeing, it is preferable that the polyester is a copolymer of a polyalkylene glycol copolymerized with polyethylene terephthalate, and can be dyed by disperse dyes at 90° C. to 110° C. Polyester fibers made of this polyester can be mixed with natural fibers and dyed.

Furthermore, for dark and clear dyeing, it is preferable that the polyester is a cation dye dyeable polyester having 5-sodiumsulfoisophthalic acid copolymerized with it.

In the present invention, the polyester product includes various styles such as fiber, yarn, fibrous material, woven fabric, knitted fabric, nonwoven fabric, fiber material, net, ribbon, film, sheet, etc. Neither is it limited in shape, and includes the shapes of all articles, and also shapes of clothing. The present invention gives, in particular, a remarkable effect in holding three-dimensional shapes of interlining cloths for clothes, brassieres, pads for breasts and shoulders, collar interlining cloths or the like, and can be preferably applied to them. In this case, usually they are set in respective molds and exposed to an atmosphere of heat treatment.

The net is not especially limited either, and includes fishing nets of English flat knots, double English flat knots, etc., insect catching nets, washing nets, quilt cover nets, curtains, headgear nets, etc. The present invention can be applied to them, to allow them to retain various three-dimensional shapes, and allows them to be used very easily.

As for an interlining cloth for clothes, after an interlining cloth member, traditionally known as a "canvas", is made or after a dress containing it is sewn, it can be heat-treated so as to enable it to retain its shape as an effect of the present invention. Conventionally, an interlining cloth has been produced by overlapping and sewing many fiber sheets to form a three-dimensionally curved shape, for retaining the shape of a dress and for expressing the body lines beautifully. However, if the present invention is applied, a three-dimensional curved shape can be retained without any multi-layer structure, to allow reduction in weight and to make the wearer feel cool. The structure and weave of the interlining cloth are not especially limited, but a coarsely stitched knitted fabric, called a "mesh", can be preferably applied, to further enhance the effect of the present invention. Three-dimensional shapes are not especially limited either in brassieres and pads for breasts and shoulders.

In addition, as fluff-raised fabrics such as carpets, artificial lawns and moquettes, or molded brushes such as tooth brushes and washing brushes, remarkable shape retainability and durable bendability can be obtained, and fluff-raised products less liable to yield can be obtained.

Moreover, if a shirt is prepared by partially or wholly using a nonwoven fabric, woven fabric or knitted fabric, etc. composed of only the yarns of said polyester fibers or the yarns formed by mixing or mix-spinning the polyester fibers with rayon, cotton, or hemp, and heat-treating with a sharp temperature gradient of 0.5 to 10° C./second at not lower than the second order transition temperature of the polyester fibers, then a shirt with good shape retainability can be obtained. In this case, compared to the conventional shape stabilization processing by VP and various resins, the present invention does not cause problems in that harmful chemical compounds such as formalin remain or that the fibers decline in strength.

In the conventional shape stabilization processing for a mix-spun yarn of polyester fibers and cotton, the cellulose component of cotton is crosslinked or modified, but in the present invention, the polyester fibers themselves are processed so as to be capable of retaining their shape. Therefore, the effect is high, and such advantages that the fibers are not embrittled and complicated processing is not required can be obtained. Furthermore, in the case of. a mix-spun yarn of polyester fibers and cotton, if the cotton is also processed to be stabilized in shape according to a conventional method in the present invention, higher shape stabilization can be achieved, needless to say.

Moreover, the materials composed of fibers obtained in the present invention can be preferably effectively finished in various ways by dyeing, water-repellent finishing, lamination, and coating.

In another embodiment of the present invention, if specific melt-spun polyester fibers which have a yield point and a natural draw range on the stress-strain curve obtained by measuring the tensile strengths and elongations of the fibers, can be elongated at a stress within a range lower than the stress of the yield point in the elongation range from the yield point to the end point of the natural draw range, and are of less than 100% in elongation at the end point of the natural draw range are used to be made into a product, fixed to an optional shape, and subsequently treated in an atmosphere not lower than the second order transition temperature of the polyester, then a polyester product good both in resilient elasticity and dimensional stability and excellent in shape retainability can be obtained.

The yield point in this case refers to the peak (A), at which the stress-strain curve drawn by choosing the stress as the ordinate and the elongation as the abscissa exceeds the initial rise and declines, as shown in FIG. 1. On the other hand, the end point of the natural draw range refers to the point (B), at which the range showing stresses lower than that of the yield point ends to show a sharp rise.

Figure 2:
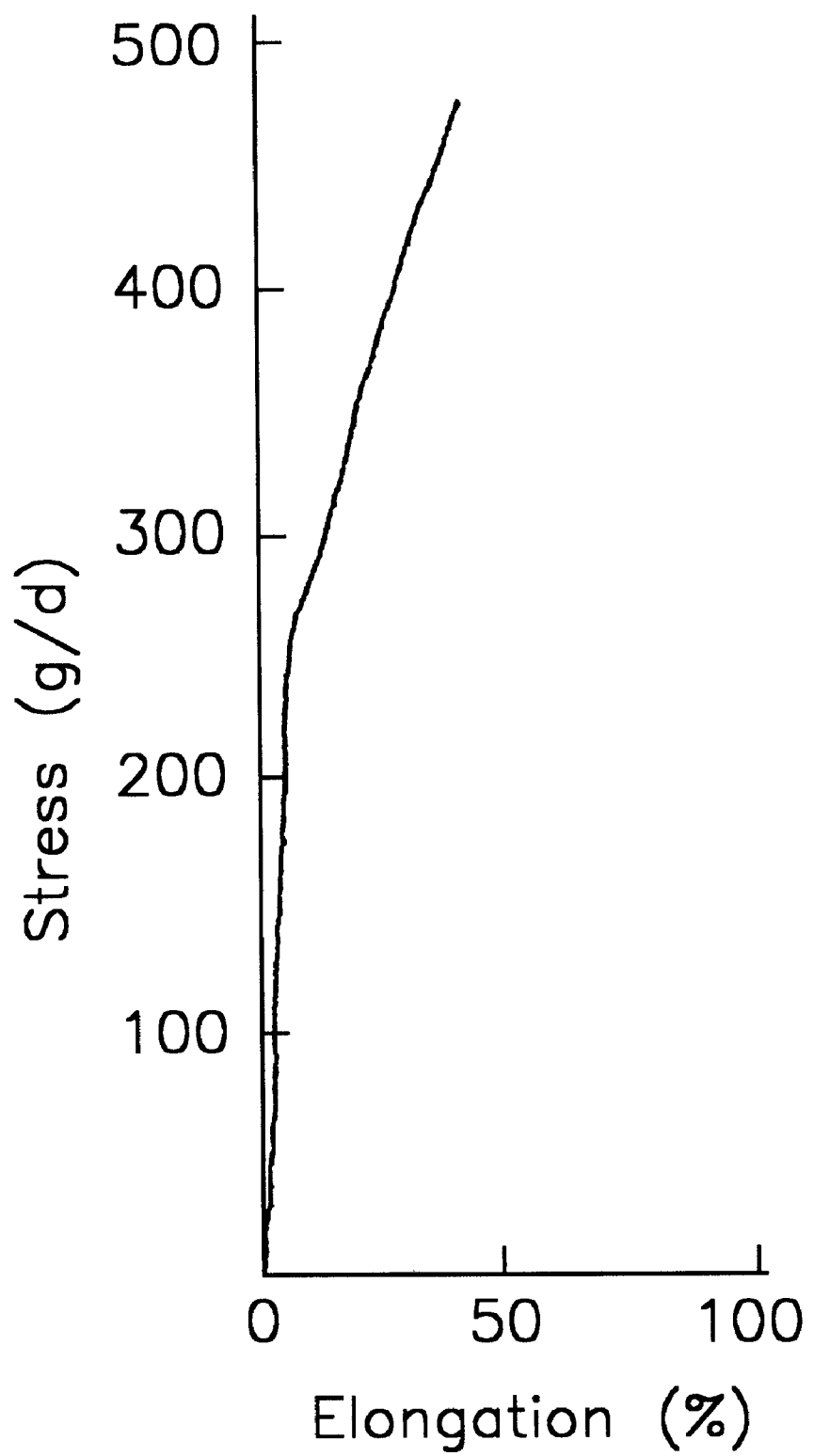
FIG. 2 shows the stress-strain curve of a conventional drawn polyester yarn.
Figure 3:
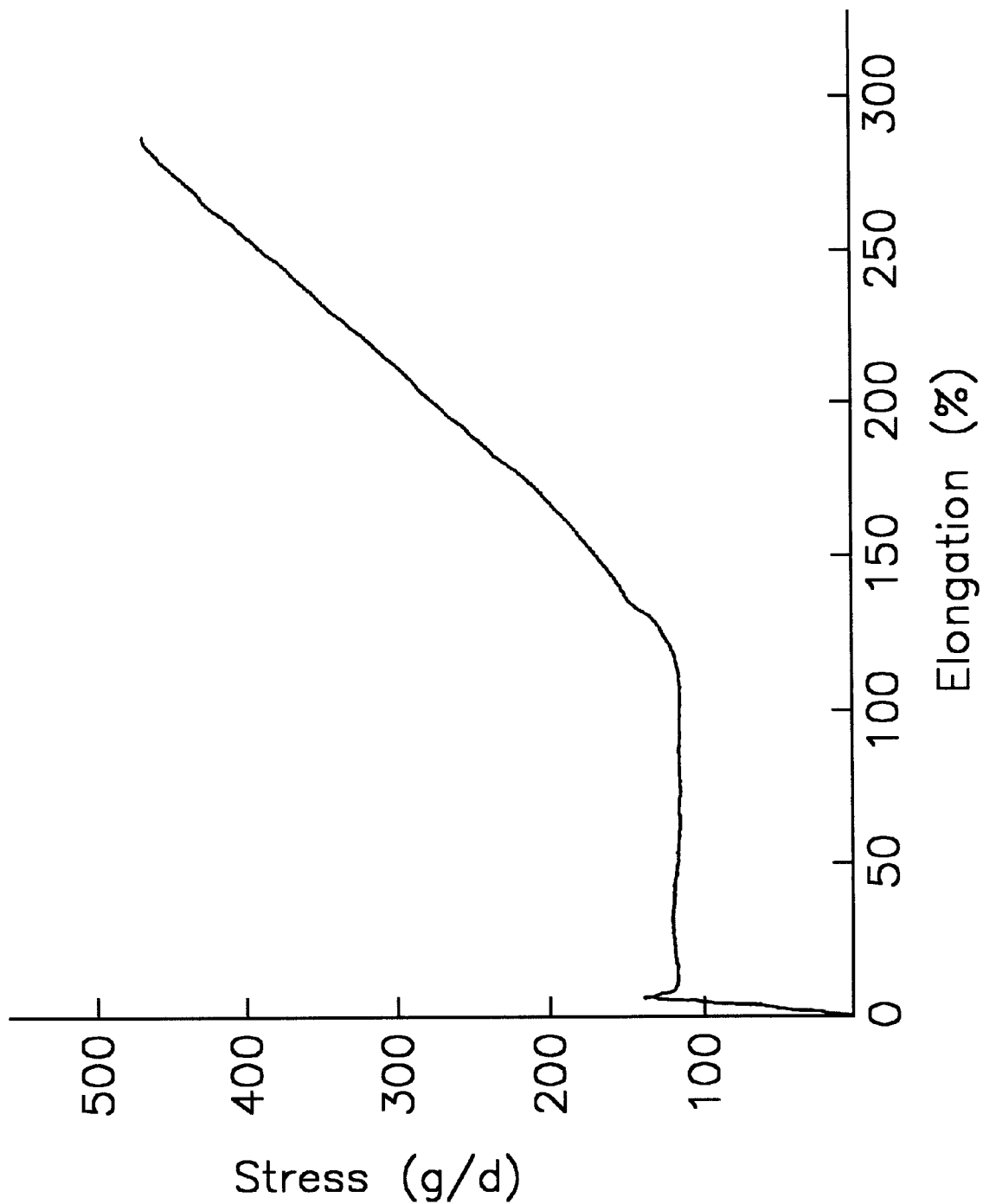
FIG. 3 shows the stress-strain curve of a conventional undrawn polyester yarn.

In this embodiment of the present invention, a melt-spun polyester fiber of less than 100% in elongation at the end point of the natural draw range (hereinafter also called a fiber of the first specified region as before) has a stress-strain curve with the maximum stress at the yield point (A) at the beginning of elongation, and with a subsequent range where the fiber is elongated at a stress within a range lower than that of the yield point (A), to reach the end point (B) of the natural draw range, as shown in FIG. 1, and is less than 100%, preferably less than 80% in elongation at the end point of the natural draw range. In other words, a portion of the stress-strain curve exists below the straight line connecting points A and B, and between the straight line AB and the stress-strain curve, there is a hatched area as shown in FIG. 1. Therefore, the present invention excludes a fiber which does not have the maximum yield point (A), or does not have a region where the fiber is elongated at a stress within a range lower than the stress of the yielding point (A), like a conventional drawn polyester yarn (of 98 deniers and 24 filaments) as shown in FIG. 2, and a fiber of not less than 100% in the elongation at the end point of the natural draw range, like a conventional undrawn polyester yarn (of 275 deniers and 96 filaments) as shown in FIG. 3.

The stress-strain curve referred to here means a curve measured according to the testing method of JIS L 1013 7.5 (Tensile Strength and Elongation Percentage). The conditions for the measurement of FIGS. 1 to 3 were as follows:
Sample length (inter-chuck distance): 5 cm
Tensile speed: 100 mm/min
Chart speed: 100 mm/min
Temperature: 20° C.±2
Humidity: 65%RH±5
Testing machine: Autograph (Shimadzu Corp.)
Data arrangement: Stress as the ordinate and elongation as the abscissa (first quadrant)

To obtain a fiber having the first specified region, a polyester is used. An aromatic polyester such as polyethylene terephthalate or polybutylene terephthalate, or a copolymer mainly composed of it can be preferably used. The take-up speed in melt spinning is preferably 2000 m/min to 4000 m/min, more preferably 2500 to 3500 m/min. For example, a polyethylene terephthalate fiber taken up at a speed of 1500 m/min is substantially called an undrawn fiber, and if it is heat-treated without being drawn, it becomes very fragile, to lose its capability of industrial utilization. A polyethylene terephthalate fiber taken up at a speed of 5000 m/min does not have the above mentioned yield point or the end point of the natural draw range, and cannot be shifted to the second specified region by heat treatment, becoming very poor in resilient elasticity and shape retainability. However, fibers having the above mentioned characteristics of the stress-strain curve, even spun at a speed lower than 2000 m/min and drawn at a low ratio (including the drawing by twisting), may be included in the present invention.

This embodiment of the present invention comprises, essentially, a polyester fiber, but a conventional conjugate fiber with another component such as a nylon or polyolefin conjugated, for example, separation type conjugate fiber, petal-like conjugate fiber, or islands-in-a-sea conjugate fiber, etc. can also be applied, and these conjugate fibers may be preferable, depending on applications.

If the polyester fiber is a conjugate fiber comprising polyethylene terephthalate, polybutylene terephthalate or a polyester copolymer thereof as the main component, and a polystyrene based polymer, or a polyester prepared by adding boric acid or a boron compound to polyethylene terephthalate, polybutylene terephthalate, or a polyester copolymer thereof as the other component, a polyester fiber in the first specified resin can be obtained even if the take-up speed exceeds 4000 m/min, because the spinning stress mainly acts on the other component, to inhibit the orientation of the polyester as the main component. This is possible even if the take-up speed is in a range from 4000 m/min to 8000 m/min.

For example, even if a conjugation spinning with polystyrene as the core component and polyethylene terephthalate as the sheath is effected at a take-up speed of 4500 m/min, the fiber obtained is close to a so-called POY (Pre-Oriented Yarn) obtained at a take-up speed of 2000 m/min to 4000 m/min. If a polyethylene terephthalate fiber only is taken up at a speed higher than 4500 m/min, the fiber is crystallized, but if polystyrene is used as one component additionally as mentioned above, it can be postulated that the polystyrene accepts the spinning stress, to provide a fiber close to a POY. If such a conjugate fiber is used, a fiber taken up at a speed of 4000 m/min to 8000 m/min can be used to produce the polyester product of the present invention. In this case, a polyester polymer thickened by adding boron or a boric compound to polyethylene terephthalate, polybutylene terephthalate or a polyester copolymer thereof can also be used as the core component. In this case, the material of the core component and the sheath component can be switched with one another, but using the main component as the sheath component is preferable in view of dyeability, frosting, fibrillation, etc. because the properties of the main component can be exhibited.

If the fibers in the first specified region are made into a desired polyester product, and subsequently fixed to an optional shape, and heat-treated at not lower than the second order transition temperature of the polyester, then the polyester fibers or polyester film in the second specified region is obtained. The polyester product in this case includes various styles such as fiber, yarn, fibrous material, woven fabric, knitted fabric, nonwoven fabric, fiber material, net, ribbon, sheet, etc. Neither is the shape especially limited, and includes shapes of all articles, and also shapes of clothing.

The heat treatment should be performed in an atmosphere of preferably 20° C. or more, more preferably 40° C. or more, higher than the second order transition temperature of the polyester. In the case of polyethylene terephthalate, since its second order transition temperature is about 72° C., the treatment should be performed in an atmosphere preferably not lower than 92° C., more preferably not lower than 120°

C. Therefore, the treatment temperature range is preferably 92 to 230° C., more preferably 120 to 230° C., further more preferably 140 to 230° C. The heating means can be either dry heat or wet heat, or both.

Figure 4:
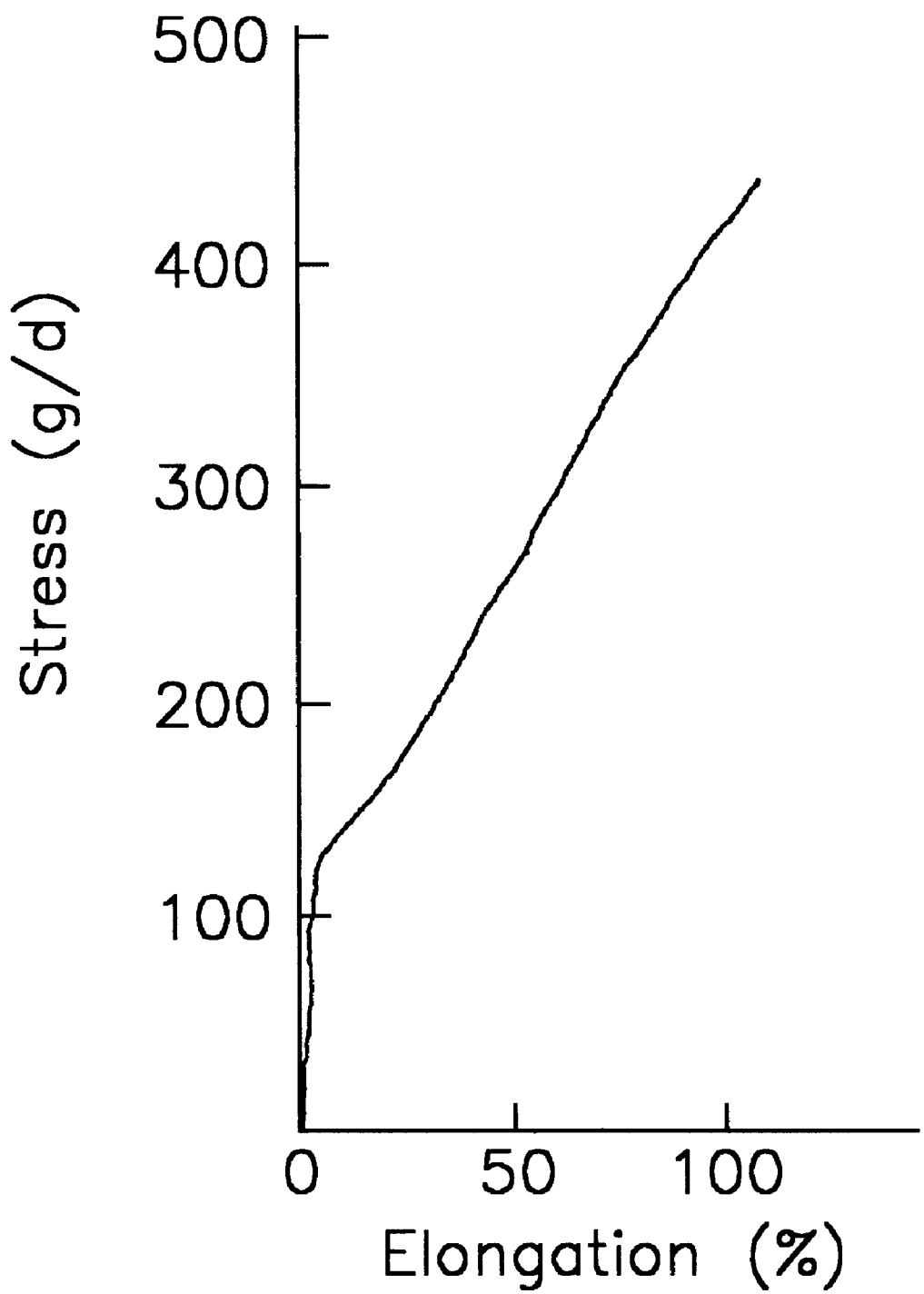
FIG. 4 shows the stress-strain curve of a polyester fiber used for producing a polyester product of the present invention.

Such heat treatment provides a stress-strain curve (a yarn of 190 deniers and 24 filaments) as shown in FIG. 4. Such a fiber has excellent resilient elasticity and shape retainability. In FIG. 4, the end point of the natural draw range substantially vanishes, and the polyester fiber or polyester film in the second specified region can have the natural draw range. In this case, it is preferable that the difference between the elongation at the yield point and that at the end point of the natural draw range is 20% or less. More preferably, the difference in elongation is substantially 0%.

Furthermore, to preferably achieve the present invention, the melt-spun fibers in the first specified region are formed into a desired polyester product, fixed to an optional shape, preferably a three-dimensional shape, and heat-treated at a temperature not lower than the second order transition temperature of the polyester. In this case, it is preferable that the thermal history a before forming as a product or fixing as an optional shape and the thermal history β after forming into a secondary product or fixing as the optional shape is in the relation of α<β, and it is preferable that the difference between αand β is larger. As for the thermal history in this case, the quantity of heat received by the fibers after having been melt-spun and taken up is expressed as α, and the quantity of heat received by the fibers after they have been made into a product and fixed to an optional shape, as β. The quantities of heat can be compared by examining the stress-strain curves.

Therefore, since the effect of the present invention can be obtained by treatment at a temperature not lower than the second order transition temperature after forming the fibers into a product or fixing to an optional shape, a thermal history of α at a temperature not lower than the second order transition temperature is not preferable. A condition that fibers are not subjected to thermal history, for example, drawing at room temperature does not remarkably decrease the effect of the present invention.

From the viewpoints of inhibiting creasing and enhancing the effects of resiliency and shape retainability, the heat treatment of the product comprising the polyester fibers from the first specified region to the second specified region can be effected in at least two steps, with the heat treatment in the latter step effected in wet heat and/or dry heat at not lower than the temperature of the first step, lower than the melting point of the polyester and higher than 120° C.

When a fibrous polyester material in the first specified region obtained by taking up a molten polyester at a take-up speed of 2000 to 4000 m/min is heat-treated as described above, the use of heated rolls before winding allows the heat treatment to be applied concurrently with the step of spinning, to enhance productivity.

Said heat treatment can also be applied by using heated air, for example, by air entangling.

Furthermore, said heat treatment can be applied by heating the fibrous polyester material after forming knitted fabric, and disassembling it.

An embodiment of molded polyester product of the present invention comprises a 4-point image in the scattering image obtained by small-angle X-ray scattering photography, is of 8 nm to 15 nm in the Dm value (one unit period of crystal lattice/non-crystal lattice in the fiber axis direction) of the long period obtained on said photo, and 20 nm to 35 nm in the De value (one unit period of crystal lattice/non-crystal lattice in the cross-sectional direction of the fiber), and further satisfies the following conditions (1) to (5):

(1) 1.350 to 1.385 in specific gravity,
(2) 2.0 nm to 4.0 nm at Miller index (010), 2.3 nm to 4.0 nm at Miller index (100), and 1.5 nm to 4.2 nm at Miller index ($\overline{1}$05), as crystal sizes obtained by wide-angle X-ray diffraction measurement,
(3) 58% to 85% in the degree of crystal orientation obtained by wide-angle X-ray diffraction measurement,
(4) 0.088 to 0.450 in the amorphous orientation by polarized fluorescence method,
(5) $50 \times 10^{-3}$ to $120 \times 10^{-3}$ in birefringence Another embodiment of molded polyester product of the present invention is a molded polyester product such as a polyester fiber or a polyester film, which comprises a 2-point image in the scattering image obtained by small-angle X-ray scattering photography, is of 15 nm or less in the J value obtained from the following equation, where r is the distance from the meridian or equator to the center of the scattering image on said photo, and further satisfies the above conditions (1) to (4);

$$J = \lambda/2 \sin [\{\tan^{-1}(r/R)\}/2]$$

where R: radius of camera, l: wavelength of X ray, J: long period

A still further embodiment of molded polyester product of the present invention is a molded polyester product such as a polyester fiber or a polyester film, which comprises a 4-point image in the scattering image obtained by small-angle X-ray scattering photography, is of less than 14 nm in the Dm value (one unit period of crystal lattice/non-crystal lattice in the fiber axis direction) of the long period obtained on said photo, 18 nm or more in the De value (one unit period of crystal lattice/non-crystal lattice in the cross-sectional direction), and less than 1.0 in Dm/De, and further satisfies the above conditions (1) to (5).

In the present invention, the method and conditions of small-angle X-ray scattering photography are as practiced in ordinary X-ray scattering measurement. The inventors used the following method and conditions.

X-ray generator: Model RU-200 produced by Rigaku Denkisha K.K.
   X-ray source: CuKα ray (using Ni filter)
   Output: 50 kV, 200 mA
   Slit diameter: 0.5 mm
Photographing conditions
   Radius of camera: 400 mm
   Exposure time; 120 minutes
Film: Kodak DEF-5
Methods and conditions for measuring respective properties were as follows.
(1) Specific gravity; According to JIS L 1013 7.14.2 "Density-gradient method".
(2) Crystal size measurement by wide angle X-ray diffraction (counter method)
(a) Wide angle X-ray diffraction
X-ray generator: Produced by Rigaku Denkisha K.K.
   X-ray source: CuKα ray (using Ni filter)
   Output: 35 kV, 15 mA
Goniometer: Produced by Rigaku Denkisha K.K.
   Slit diameter: 2 mm dia. pinhole collimator
   Detector: Scintillation counter
Counting recorder: RAD-C, on-line data processing system
   Scanning range in equator direction: 10 to 35°
   Scanning range in meridian direction: 30 to 55°
   Scanning method Step: 2θ/θ
Sampling intervals: 0.05°/step
Integrating time: 2 seconds
Scanning range in circumferential direction (β): 90 to 270°
Sampling intervals: 0.5°/step
Integrating time: 2 seconds
(b) Wide-angle plate photography
X-ray generator: Model 4036A2 produced by Rigaku Denkisha K.K.
X-ray source: CuKα ray (using Ni filter)
Output: 35 kV, 15 mA
Slit diameter: 1 mm dia. pinhole collimator
Photographing conditions
Radius of camera: 40 mm
Exposure time: 20 minutes
Film: Kodak DEF-5

The crystal sizes were calculated from the half widths of the peaks of Miller indexes (010), (100) and ($\bar{1}$05), using the following Scherrer's formula.

$$L(hkl) = K\lambda/\beta_0 \cos \theta_B$$

where L(hkl): Average size in the direction perpendicular to the (hkl) face of crystallite
K: 1.0, λ: Wavelength of X-ray, $\beta_0 = (\beta_E^2 - \beta_I^2)^{1/2}$
$\beta_E$: Apparent half width (measured value)
$\beta_I$: $1.05 \times 10^{-2}$ rad., $\theta_B$: Bragg angle (3) Degree of crystal orientation by wide-angle X-ray diffraction measurement From the half width H of the intensity distribution obtained by scanning, in the circumferential direction, the (010) observed near 2θ=17.5 and the (100) observed near 2θ25.7, the degree 5 of crystal orientation is calculated using the following formula:

$$\text{Degree of crystal orientation } (\%) = [(180 - H)/180] \times 100$$

(4) Birefringence: Measured according to the Senarmont method and the compensator method, using the D-line color light of Na electric bulb.

(5) Amorphous orientation by polarized fluorescence method
Instrument: FOM-1 produced by Nihon Bunko Kogyo
Optical system: Transmission method (excitation light wavelength; 365 nm, fluorescence wavelength: 420 nm)
Measuring system: By rotating with the polarizer kept parallel and perpendicular to the analyzer, the angle distribution of polarized fluorescence intensities (I∥ and I⊥) in the plane was obtained, where ∥ is a parallel sign, and ⊥, a perpendicular sign.

The amorphous orientation was obtained from the following formula, as monoaxial orientation coefficient $f^2$.

$$f^2 = 3/2[\{I\|(0) + 2I\perp(0)\}/K - 1/3]$$

where
K = {I∥(0) + 4I⊥(O) + 8/3I∥(90)}
I∥(0): Relative polarized fluorescence intensity in the axial direction by parallel measurement
I∥(90): Relative polarized fluorescence intensity in the direction perpendicular to the above by parallel measurement
I⊥(0): Relative polarized fluorescence intensity in the axial direction by perpendicular measurement.

When fibers are used for the molded polyester product in this embodiment of the present invention, fibers melt-spun under specific conditions (hereinafter called a fiber in the first specified region as mentioned before) is treated to allow its fine structure, i.e., crystalline and amorphous states and orientation to be changed to limited extents, without being falsely twisted while being heated, or without being additionally drawn with heating unlike the conventional methods. Thus, fibers in a region with the orientation and crystallization controlled to give the specific values required in this embodiment of the present invention (the second specified region) is produced, which is good both in resilient elasticity and dimensional stability and excellent in shape retainability as intended in the present invention.

For example, to obtain the fiber in the first specified region, a polyester, preferably an aromatic polyester such as polyethylene terephthalate or polybutylene terephthalate or a copolymer mainly composed of any one of them is melt-spun and taken up with the take-up speed limited in a range from 2000 m/min to 4000 m/min, preferably 2500 to 3500 m/min, to obtain the intended polyester fiber.

Table 1 shows values indicating the properties of three typical polyester fibers described in later examples ((1) an undrawn yarn taken up at 1500 m/min, (2) a POY taken up at 3100 m/min, and (3) a yarn obtained by thermally drawing a POY taken up at 3100 m/min, to 1.8 times) measured respectively before or after heat treatment (in dry heat at 160° C. for 1 minute) in a constrained condition without substantial drawing. As for the POY, values indicating the properties of a POY heat-treated (in dry heat at 180° C. for 1 minute) in a constrained condition without drawing (1) and of a POY heat-treated (at 100° C. for 1 minute) and further heat-treated (in dry heat at 180° C. for 1 minute) (2) are shown. Table 2 shows the tensile strengths of the three kinds of fiber, and also the results of evaluation of tubularly knitted fabrics produced from these fibers, as to their shape stability, shape retainability and resilient elasticity. Table 3 shows the specific gravities, birefringences and amorphous orientation values of the respective fiber samples.

As shown in Table 1, the undrawn yarn (1) and the drawn yarn (3) could not satisfy the properties of the resent invention and could not have the preferable shape retainability or resilient elasticity. The properties intended in the present invention could be achieved by the POY samples taken up at a speed of 3100 m/min and heat-treated under two different conditions, and their tubularly knitted products.

The molded polyester product includes various styles made of polyester material such as fiber, film. A polyester fiber is essentially required to comprise a polyester fiber with said specific structure, but a is conventionally known conjugate fiber with another component such as a nylon or a polyolefin conjugated, for example, separation-type conjugate yarn, petal-like conjugate yarn or islands-in-a-sea type conjugate yarn can also be applied. Depending on applications, such conjugate yarns may be preferable. A polyester film includes a slit, ribbon, and tape respectively small in thickness compared to width and length.

In the present invention, the polyester fiber or film in the first specified region can be heat-treated to be shifted into the second specified region with the shape kept, and an unprecedented polyester fiber or film high in resilient elasticity can be obtained. Furthermore, if the polyester fiber or polyester film is made into a desired polyester product, fixed as an optional shape, and treated at not lower than 120DC, the product can be good in both resilient elasticity and dimensional stability and excellent in shape retainability.

The fiber or film, etc. shifted from the first specified region to the second specified region shows properties not shown by any conventional fibers or films, and even though the product is made of a polyester, it is high in elasticity and remarkably good in bending resistance against repetitive bending like nylons, and also has dimensional stability in dry and wet conditions as an advantage peculiar to the polyester fibers and film. That is, the polyester fiber and film of the present invention have an epochal effect of having the advantages of both nylons and polyesters, and also practical physical properties, to allow industrially very effective utilization.

The treatment for shifting from the first specified region to the second specified region can be achieved by heat treatment in an atmosphere of not lower than the second order transition temperature of the polyester, preferably in an atmosphere of 20° C. or more, more preferably 40° C. or more higher than the second order transition temperature. Since the second order transition temperature of polyethylene terephthalate is about 72° C., the treatment should be performed in an atmosphere preferably not lower than 92° C., more preferably not lower than 120° C. Therefore, the treatment temperature range is preferably 92 to 230° C., more preferably 120 to 230° C., still more preferably 140 to 230° C. The heating means can be either dry heat or wet heat, or both. An embodiment of fiber material of the present invention is a fiber material obtained by uniting fibers by a combined mixing and twisting, mixing, conjugating, mix-texturing, mix-spinning or covering the above polyester fiber, and at least one kind of fiber selected from the group consisting of a fiber obtained by at least drawing a polyethylene terephthalate based fiber prepared by taking up a molten polyester at 2000 m/min to 4000 m/min, drawn polyethylene terephthalate based yarn, regenerated cellulose fiber, cotton, hemp, wool, acetate, polyamide fiber, aramid fiber, and silk.

In this case, the fiber material obtained by uniting fibers by a combined mixing and twisting, etc. can have not only better properties, but also excellent bulkiness, flexibility and resiliency.

An embodiment of the fibrous sheet of the present invention is a fibrous sheet formed as a woven fabric, knitted fabric, nonwoven fabric, paper-like sheet or net-like sheet of a fiber obtained by conjugating or mixing the above polyester fiber and at least one kind of fiber selected from the group consisting of a fiber obtained by at least drawing a polyethylene terephthalate based fiber prepared by taking up a molten polyester at 2000 m/min to 4000 m/min, drawn polyethylene terephthalate based yarn, regenerated cellulose fiber, cotton, hemp, wool, animal hair, acetate, polyamide fiber, acrylic fiber, polyurethane fiber, aramid fiber, and silk.

In this case, the fiber sheets obtained by conjugating or mixing can have not only better is properties, but also excellent bulkiness, flexibility and shape retainability.

An embodiment of the fiber material of the present invention is a fiber material comprising polyester fiber.

The fiber material referred to here includes a base fabric for swimming wear, pad for swimming wear, pad for brassiere, hosiery, part for clamping a diaper, breast interlining cloth of dress, collar interlining cloth for a shirt, adhesive interlining cloth dotted or coated with an adhesive, and also a shirt, suit, coat, blazer, curtain and carpet respectively made from a union cloth prepared in combination with a mix-spun yarn consisting of a polyester and cotton, and hairs of a brush, etc.

In this case, a fiber material which is flexible, has anti-drape stiffness, has stiffness not liable to form creases, and is not liable to be deformed can be obtained.

An embodiment of an interlining cloth of the present invention is an interlining cloth comprising a woven fabric or knitted fabric formed by using a fiber comprising the above polyester fiber, in which the fiber comprising the polyester fiber has a twist count of 800 T/m or less.

In this case, an interlining cloth higher in is resiliency and shape retainability can be obtained.

An embodiment of a pad of the present invention is a pad comprising a woven fabric or knitted fabric formed by using a fiber comprising the above polyester fiber, in which the fiber comprising the polyester fiber has a twist count of 800 T/m or less.

In this case, a pad higher in resiliency and shape retainability can be obtained.

An embodiment of a shoulder pad of the present invention is a shoulder pad produced by heat-treating at not lower than 120° C. a shoulder pad comprising polyester fibers spun at 2000 m/min to 4000 m/min and not drawn, with a base fabric cover around the shoulder pad, and/or the fabric inside the shoulder pad being maintained in a certain shape to form an outward protrusion.

In this case, if polyester fibers spun at 2500 m/min to 3500 m/min are used as a base fabric cover around a shoulder pad, without heat treatment at a high temperature, and subsequently it is heat-treated, then the portion becomes excellent in shape retainability and resiliency, to be most suitable for the cover.

An embodiment of collar interlining cloth of the present invention is a collar interlining cloth produced by forming a collar interlining cloth comprising polyester fibers spun at 2000 m/min to 4000 m/min and not drawn, serving as weft (or warp), and other fibers serving as warp (or weft), and heat-treating it at not lower than 120° C., while maintaining it in a certain shape to form an outward protrusion, after having shaped it to provide a surface curved to form a protrusion in one direction.

In this case, polyester fibers spun at 2500 m/min to 3500 m/min and not drawn are used as weft (or warp), and other fibers which do not comprise said polyester fibers are used as warp (or weft), to form a collar interlining cloth, and while maintaining it in a certain shape to form an outward protrusion, after having shaped it to have a surface curved to form a protrusion in one direction, it is heat-treated at not lower than 120° C. The interlining cloth is excellent in retainability of the shape curved outward in one direction and in resiliency based on the shape. Thus, it is highly resilient against bending in the horizontal direction, but can respond very flexibly to bending in the vertical direction.

Another embodiment of interlining cloth of the present invention is an interlining cloth produced by forming a interlining cloth comprising polyester fibers spun at 2000 m/min to 4000 m/min and not drawn, and heat-treating it at not lower than 120° C., while maintaining it in a shape providing a surface curved to form a protrusion in one direction.

Another embodiment of interlining cloth of the present invention is an interlining cloth produced by forming a interlining cloth comprising polyester fibers spun at 2000 m/min to 4000 m/min and not drawn, and heat-treating it at not lower than 120° C., while maintaining it in a shape providing a surface curved to form a protrusion in one direction.

In this case, if the polyester fibers spun at 2500 m/min to 3500 m/min and not drawn are formed as an interlining cloth (including a body interlining cloth and a breast interlining cloth) or an inside belt, and heat-treated while maintaining it to provide a surface curved to form a protrusion in one direction, outward appearance is very good because the breast looks swollen or the belt looks outwardly rounded.

Another embodiment of interlining cloth of the present invention is an interlining cloth produced by forming an interlining cloth comprising polyester fibers spun at 2000 m/min to 4000 m/min, not drawn and not subjected to a thermal history of not lower than the second order transition temperature, as weft, and using other fibers as warp, and heat-treating it at not lower than 120° C., while maintaining it in a certain shape to form an outward protrusion, after having shaped it to form a surface curved to form a protrusion in the horizontal direction.

In this case, polyester fibers spun at 2500 m/min to 3500 m/min and not drawn are used as the weft of an interlining cloth (including a body interlining cloth and a breast interlining cloth), and wool, cotton, rayon, hemp or synthetic fibers, etc. are used as the warp, to form a union cloth interlining cloth. If it is heat-treated at not lower than 120° C. while maintaining it so as to provide a surface curved to form a protrusion in the horizontal direction, a very good interlining cloth smooth in the vertical direction and stiffly swollen in the horizontal direction can be formed. Clothes prepared by using this interlining cloth look very good.

An embodiment of crease-processed fabric of the present invention is a crease-processed fabric produced by crease-processing a woven fabric, knitted fabric or nonwoven fabric formed by at least partially using polyester fibers spun at 2000 m/min to 4000 m/min and not drawn, and heat-treating it at not lower than 120° C.

In this case, if polyester fibers spun at 2500 m/min to 3500 m/min and not drawn are used alone or together with other fibers, to form a fabric, and it is crease-processed and heat-treated, then a crease-processed fabric excellent in shape retainability and resiliency based on the shape, with the properties retained even after dyeing later can be obtained.

An embodiment of fibers with crimps of the present invention is a fiber with crimps produced by forming a fiber with crimps by using only a polyester fiber spun at 2000 m/min to 4000 m/min and not drawn, or together with another fiber, and heat-treating it/them at not lower than 120° C.

In this case, if polyester fiber spun at 2500 m/min to 3500 m/min and not drawn is used alone or together with another fiber, to form a fiber with crimps, and it is heat-treated at not lower than 120° C., then the fiber is good in crimp retainability and excellent in resilient elasticity. Furthermore, if the fiber is brought together with nylon 6, nylon 66, or polypropylene, etc. and fed to a crimper, both the fibers can be crimped.

Another embodiment of fiber of the present invention is a fiber produced by heat-treating only a polyester fiber spun at 2000 m/min to 4000 m/min and not drawn, or together with another fiber, at not lower than 120° C. in a constrained or loose condition without drawing, and then drawing.

In this case, the fiber has a very high shrink stress, though is low in shrinkage. The fiber can be drawn even though once heat-treated. Furthermore, since it memorizes the heat-treated state well, it is high in shrink stress.

An embodiment of woven fabric of the present invention is a woven fabric produced by crimping only polyester fibers spun at 2000 m/min to 4000 m/min and not drawn, or together with other fibers, without drawing, subsequently cutting them into staple fibers, spinning them into yarns, weaving them into a fabric, and heat-treating it at not lower than 120° C. with the fabric kept in a constrained or loose condition.

An embodiment of the knitted fabric of the present invention is a knitted fabric produced by crimping only polyester fibers spun at 2000 m/min to 4000 m/min and not drawn, or together with other fibers, without drawing, subsequently cutting them into staple fibers, spinning them into yarns, weaving them into a fabric, and heat-treating it at not lower than 120° C. with the fabric kept in a constrained or loose condition.

In this case, since crimped fibers which memorize the crimped state well are used as the fibers constituting the woven or knitted fabric, the fabric is very bulky and excellent in soft feeling.

An embodiment of a staple fiber of the present invention is a staple fiber produced by crimping only polyester fibers spun at 2000 m/min to 4000 m/min and not drawn, or together with other fibers, without drawing, subsequently cutting them into staple fibers.

In this case, the staple fibers memorize the crimped state well. So, if they are used to make a thick bed quilt or mat and thermally set, the product is very light in weight.

An embodiment of a shirt of the present invention is a shirt produced by weaving or knitting yarns made by spinning only said stable fibers or yarns made by mix-spinning said staple fibers and other fibers into a fabric, sewing it to form a shirt, and heat-treating it at not lower than 120° C.

In this case, the shirt is excellent in shape stability and resilient elasticity.

An embodiment of headgear of the present invention is a headgear produced by forming a knitted fabric using only polyester fibers spun at 2000 m/min to 4000 m/min and not drawn, or together with other fibers, without drawing, molding it into a headgear, and then heat-treating it at not lower than 120° C. An embodiment of headgear body of the present invention is a headgear body comprising said headgear.

In this case, the headgear body has an effect of especially "high deformation", and is good in shape retainability and resilient elasticity based on the shape.

An embodiment of carpet of the present invention is a carpet produced by crimping only polyester fibers spun at 2000 m/min to 4000 m/min and not subjected to a thermal history of not lower than second order transition point, or together with other fibers, without thermally drawing, forming them into a carpet, and then heat-treating it at not lower than 120° C.

In this case, more than the simple use of the above specific fibers to make a carpet is available. It is characteristic that crimped fibers are used to form a carpet without thermal setting, or that fibers crimped without having been thermally set are thermally set and used to form a carpet.

An embodiment of an air bag of the present invention is an air bag produced by forming an air bag using only polyester fibers spun at 2000 m/min to 4000 m/min and not drawn, or together with other fibers, without thermally drawing, and then heat-treating it at not lower than 120° C.

In this case, the air bag memorises the swollen shape. Since an air bag must swell immediately fully as designed to protect the passenger, the air bag which memorises the swollen shape is liable to swell instantaneously, to act as an excellent air bag.

An embodiment of cord of the present invention is a cord produced by forming a woven fabric, knitted fabric, braid or nonwoven fabric using only polyester fibers spun at 2000 m/min to 4000 m/min and not drawn, or together with other fibers, cutting it into a cord, and then heat-treating it at not lower than 120° C.

In this case, since the cord is excellent in shape stability and shape retainability, it can be used instead of the shape memory alloy wire for the brassiere. It can also be used to surround a bag, etc. Since the cord can be hardened by itself and can be adhered to another piece of the cord, it can be used for various applications.

EXAMPLES

Example 1, and Comparative Examples 1 and 2

Polyethylene terephthalate (IV=0.72) wan melt-spun at a spinning temperature of 285° C. at a take-up speed of 3100 m/min, to obtain a raw yarn of 160 deniers and 48 filaments. The raw yarn was 3.0 g/d in strength and 165% in elongation. The raw yarn was used to knit a tubularly knitted fabric by a tube knitting machine, and it was set and fixed around a rectangular mold, and heat-treated in dry heat at 180° C. for 60 seconds, to prepare a material composed of fibers shaped like the mold (Example 1).

As Comparative Example 1, the same polyethylene terephthalate as used in Example 1 was melt-spun at a spinning temperature of 285° C. at a take-up speed of 120.0 m/min, and drawn according to a conventional is method to obtain a drawn yarn (150 deniers, 48 filaments, strength 4.9 g/d, elongation 46%). It was treated as described for Example 1. As Comparative Example 2, a nylon was melt-spun at a take-up speed of 3000 m/min, to prepare a nylon yarn (200 deniers, 24 filaments, strength 3.2 g/d, elongation 175%), and it was treated as described for Example 1.

As a result, in Example 1, a material shaped like the rectangular mold could be obtained, and in addition, even if it was washed by water 5 times and by dry cleaning, the rectangular shape was not deformed, Furthermore, even after conducting 20 times the buckling test, it did not yield. On the other hand, the materials obtained in Comparative Examples 1 and 2 were too flexible to have the rectangular shape, Examples 2, 3 and 4, and Comparative Examples 3 and 4

Polyethylene terephthalate (IV=0.68) was melt-spun at a spinning temperature of 285° C. at a take-up speed of 3000 m/min, to obtain a raw yarn of 200 deniers and 24 filaments. The raw yarn was 2.8 g/d in strength and 175% in elongation. The raw yarn was knitted into a mesh fabric of 1/1 4-course double atlas in front stitch pattern and 1/3 4-course double atlas in back stitch pattern by an 18-gauge 4-guide bar raschel machine. The knitted fabric was used to make (1) a front body interlining cloth of a coat (Example 2), (2) a brassiere (Example 3), and (3) a breast pad for swimming wear (Example 4). They were fixed in the respective three-dimensional molds, and heat-treated in dry heat at 180° C. for 30 seconds, to prepare materials composed of fibers shaped like the respective molds.

As Comparative Example 3, the raw yarn melt-spun as above was sent to a heating roll of 150° C., to be drawn to 1.7 times, and the drawn yarn was treated as described for Examples 2, 3 and 4, using the same molds. As Comparative Example 4, nylon was melt-spun at a take-up speed of 3000 m/min, to prepare a yarn of 200 deniers and 24 filaments, and of 3.2 g/d in strength and 175% in elongation, and it was treated similarly.

As a result, all the materials composed of fibers 5 according to the present invention were very good in shape retainability. The coats of (1) had three-dimensional shapes expressing the beautiful curved surfaces along the body lines. The coats were lighter in weight and higher in air permeability, being highly comfortable to wear, compared with conventional coats. Even if they were washed by water 5 times and by dry cleaning, they were not deformed. The materials of (2) and (3) were also good in three-dimensional shape retainability, and even if they contained perspiration and water, they did not show any problem in dimensional stability.

On the other hand, the materials obtained in Comparative Examples 3 and 4 were not sufficient in shape retainability, and could not hold the intended shapes.

Example 5

Polyethylene terephthalate (IV=0.68) was melt-spun at a spinning temperature of 285° C. at a take-up speed of 3000 m/min, to obtain a raw yarn of 75 deniers and 36 filaments. The raw yarn was doubled into a yarn of about 100,000 deniers, and it was fed through a crimper, to be crimped (crimps of 12 ridges/inch), and cut at a length of 51 mm, to prepare a raw polyethylene terephthalate stock (T). The raw stock (T) and raw cotton (C) were mixed to achieve T/C= 65/35 by a mixing machine. The mixed raw stock was spun into a yarn, and the yarn was woven into a plain weave fabric which was sewn into a shirt. Then, it was set and fixed on a body, and treated in a hot air dryer at 170° C. for 60 seconds. The shirt thus obtained was not liable to be creased, and so good in shape retainability that the three-dimensional shape perfectly suited the shape of the body. It was washed, but no ironing was necessary. Compared to marketed shape stabilized shirts treated by formalin, it was not inferior.

Example 6, and Comparative Examples 5 and 6

Figure 5:
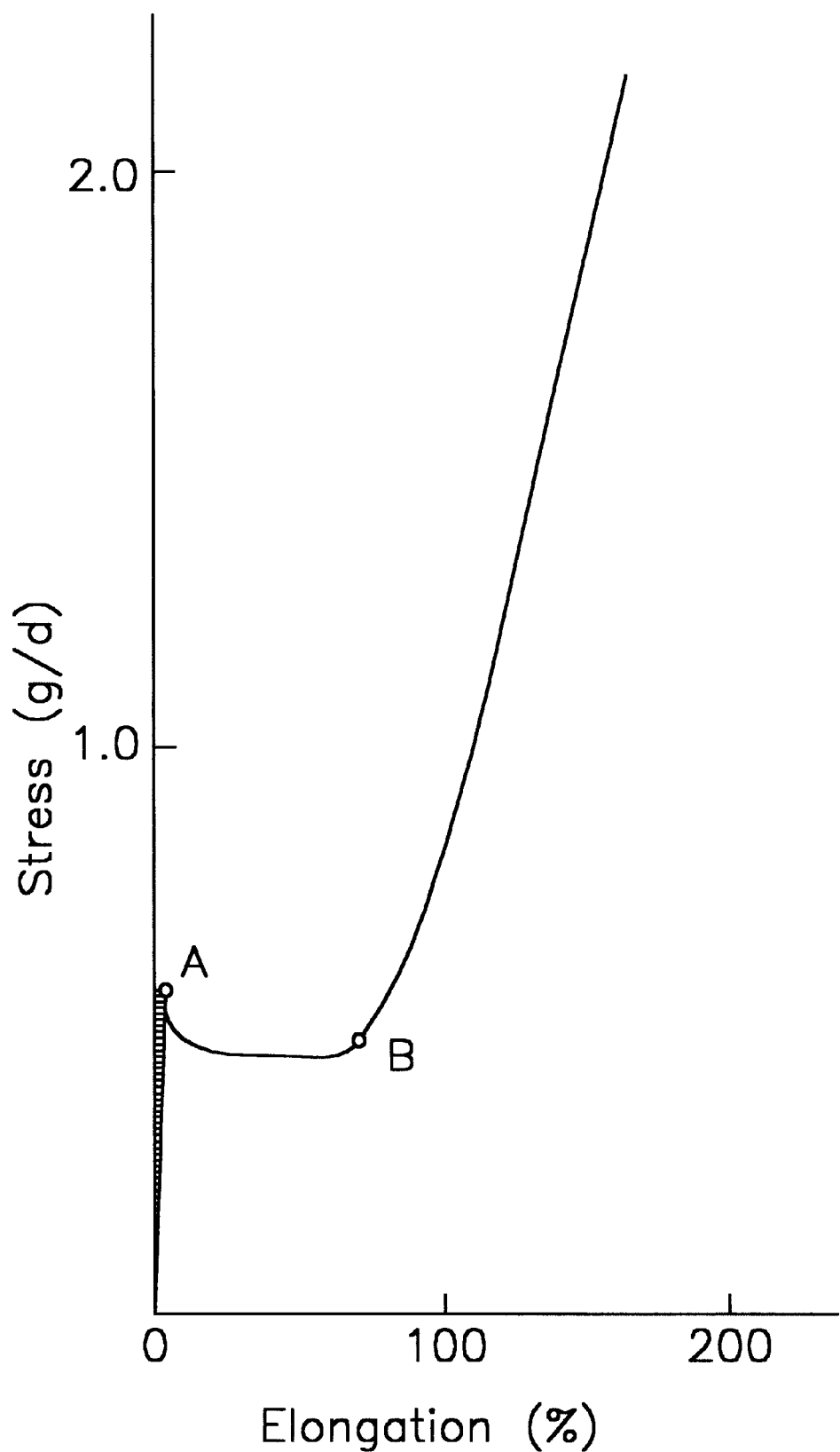
FIG. 5 shows the stress-strain curve of a gray yarn in Example 6.

Polyethylene terephthalate (IV=0.68) was melt-spun at a spinning temperature of 285° C. at a take-up speed of 3100 m/min, to obtain a raw yarn of 185 deniers and 24 filaments. The stress-strain curve of the raw yarn was as shown in FIG. 5, having a yield point A and showing a partial curve drawn from the yield point A to an end point B of a natural draw range, where the yarn was elongated at a stress within a range lower than that of the yield point. The raw yarn was 2.3 g/d in strength and 170% in elongation. The raw yarn was knitted into a tubularly knitted fabric by a tube knitting machine, set and fixed around a rectangular mold, and heat-treated at 180° C. for 60 seconds, to produce a polyester product shaped like the mold.

As Comparative Example 5, the raw yarn was further fed through a heating roll of 150° C., to be drawn to 1.4 times, and treated as described in Example 6. As Comparative Example 6, a yarn of 200 deniers, 24 filaments, 3.2 g/d in strength and 175% in elongation obtained by melt-spinning a nylon at a take-up speed of 3000 m/min was prepared and treated similarly.

As a result, in Example 6, a material shaped like the rectangular mold could be obtained, and in addition, even if it was washed by water 5 times and by dry cleaning, the rectangular shape was not deformed. Furthermore, even after conducting 20 times the buckling test, it did not yield. On the other hand, the materials obtained in Comparative Examples 5 and 6 were too flexible to have the rectangular shape.

Examples 7, 8 and 9, and Comparative Examples 7 and 8

The raw yarn obtained in Example 6 was knitted into a mesh fabric of 1/1 4-course double atlas in front stitch pattern and 1/3 4-course double atlas in back stitch pattern by an 18-gauge 4-guide bar raschel machine. The knitted fabric was used to make a front body interlining cloth of a coat (Example 7), a brassiere (Example 8), and a breast pad for swimming wear (Example 9). They were fixed in the respective three-dimensional molds, and heat-treated in dry heat at 180° C. for 30 seconds, to prepare polyester materials shaped like the respective molds.

As Comparative Example 7, the raw yarn melt-spun as above was sent to a heating roll of 150° C., to be drawn to 1.4 times, and the drawn yarn was treated as described for Examples 7, 8 and 9, using the same molds. As Comparative Example 8, nylon was melt-spun at a take-up speed of 3000 m/min, to prepare a yarn of 200 deniers and 24 filaments, and of 3.2 g/d in strength and 175% in elongation, and it was treated similarly.

As a result, all the polyester produced according to the present invention were very good in shape retainability. The coats of Example 7 had three-dimensional shapes expressing beautiful curved surfaces along the body lines. The coats were lighter in weight and higher in air permeability, being highly comfortable to wear, compared with conventional coats. Even if they were washed by water 5 times and by dry cleaning, they were not deformed. The materials of Example 8 and 9 were also good in three-dimensional shape retainability, and even if they contained perspiration and water, they did not show any problem in dimensional stability.

On the other hand, the materials obtained in Comparative Examples 7 and 8 were not sufficient in shape retainability, and could not hold the intended shapes.

Example 10

Polyethylene terephthalate (IV=0.68) was melt-spun at a spinning temperature of 285° C. at a take-up speed of 3000 m/min, to obtain a raw yarn of 75 deniers and 36 filaments. The raw yarn was doubled into a yarn of about 100,000 deniers, and it was fed through a crimper, to be crimped (crimps of 12 ridges/inch), and cut at a length of 51 mm, to prepare a raw polyethylene terephthalate stock (T). The raw stock (T) and raw cotton (C) were mixed to achieve T/C= 65/35 by a mixing machine. The mixed raw stock was spun into a yarn, and the yarn was woven into a plain weave fabric which was sewn into a shirt. Then, it was set and fixed on a body, and treated in a hot air dryer at 170° C. for 60 seconds. The shirt thus obtained was not liable to be creased, and so good in shape retainability that the three-dimensional shape perfectly suited the shape of the body. It was washed, but no ironing was necessary. Compared with marketed shape stabilized shirts treated by formalin, it was not inferior.

Example 11

Polyethylene terephthalate (IV=0.68) was melt-spun to obtain the following raw yarns.
(1) An undrawn yarn of 275 deniers and 96 filaments, taken up at 1500 m/min
(2) A POY of 187 deniers and 24 filaments, taken up at 3100 min/min
(3) A drawn yarn of 98 deniers and 24 filaments obtained by thermal drawing a POY taken up at 3100 m/min, to 1.8 times These three kinds of raw yarn were wound around a mold respectively and heat-treated at 180° C. for 60 seconds by a hot air dryer, and they and those not heat-treated were examined to find their scattering images and long periods by small-angle X-ray scattering photography. The results are shown in Table 1.

As shown in Table 1, the non-treated undrawn yarn of (1) did not show any scattering image, and did not allow the measurement of the long period. The yarn heat-treated in a constrained condition of (1) showed an annular small-angle X-ray scattering image, and was 12.6 nm in long period. The non-treated POY of (2) did not show any scattering image and did not allow the measurement of the long period. The yarn heat-treated in a constrained condition of (2) showed a 4-point image as the small-angle X-ray scattering image, and was Dm/De=11.4/30.8 nm in long period. The non-treated drawn yarn of (3) showed a 4-point image as the small-angle X-ray scattering image and was Dm/De=15.4/7.7 nm in long period. The yarn heat-treated in a constrained condition of (3) showed a 4-point image as the small-angle X-ray scattering image, and was Dm/De 11.9/12.1 nm in long period.

These flat yarns were tubularly knitted, and a rectangular mold was inserted into each of the knitted tubes, for fixing them. They were heat-treated in a hot air dryer at 180° C. for 60 seconds. Among them, only the POY of (2) was good in shape retainability, durable shape retainability and resilient elasticity.

As can be seen from the above results, among the flat yarns and knitted tubes, only those heat-treated yarns of (2) were good in shape stability, shape retainability and resilient elasticity.

Examples 12 through 15, and Comparative Examples 9 and 10

The raw yarns of Example 11 were used to find the specific gravity, the crystal sizes based on wide-angle X-ray diffraction measurement, the degree of crystal orientation based on wide-angle X-ray diffraction measurement, the scattering image based on small-angle X-ray scattering photography, birefringence, and the amorphous orientation based on the polarized fluorescence method respectively. The results are shown in Tables 1 and 3.

As shown in Tables 1 and 3, only the yarns obtained by heat-treating the raw yarns of (2) had properties satisfying all the requirements of the present invention.

The raw yarn obtained in Example 11-(2) was knitted into a mesh fabric of 1/1 4-course double atlas in front stitch pattern and 1/3 4-course double atlas in back stitch pattern by an 18-gauge 4-guide bar raschel machine. The knitted fabric was used to make (a) a front body interlining cloth of a coat (Example 13), (b) a brassiere (Example 14), and (c) a breast pad for swimming wear (Example 15). They were fixed in the respective three-dimensional molds, and heat-treated in dry heat at 180° C. for 30 seconds, to prepare polyester materials shaped like the respective molds.

As Comparative Example 9, the raw yarn obtained in Example 11-(3) was treated as described for Examples 13, 14 and 15, using the same molds. As Comparative Example 10, nylon was melt-spun at a take-up speed of 3000 m/min, to prepare a yarn of 200 deniers and 24 filaments, and of 3.2 g/d in strength and 175% in elongation, and it was treated similarly.

As a result, all the polyester materials produced according to the present invention were very good in shape retainability. The coats of (a) had three-dimensional shapes expressing beautiful curved surfaces along the body lines. The coats were lighter in weight and higher in air permeability, being highly comfortable to wear, compared with conventional coats. Even if they were washed by water 5 times and by dry cleaning, they were not deformed. The materials of (b) and (c) were also good in three-dimensional shape retainability, and even if they contained perspiration and water, they did not show any problem in dimensional stability.

On the other hand, the materials obtained in Comparative Examples 9 and 10 were not sufficient in shape retainability, and could not hold the intended shapes. As yarns close to that of (3), ordinary yarns obtained by spinning at a low speed of about 1000 m/min and thermally drawn to 3–4.5 times, and yarns spun at a high speed of about 6000 to 7000 m/min did not have properties satisfying all the requirements of the present invention.

Example 16

Polyethylene terephthalate (IV=0.68) was extruded from a slot die at a temperature of 285° C., and quickly cooled by misty water spray flow, while being taken up at a speed of 3000 m/min, to obtain an about 25 μm thick and about 5 mm wide film, though very uneven.

The sample was heat-treated at 180° C. for 5 minutes in a hot air dryer. The film was high in shape retainability and resilient elasticity. The film was examined to find its scattering image and long period by small-angle X-ray scattering photography. It showed a 4-point image as the small-angle X-ray scattering image and was in a range of Dm/De= 10.0–12.5 nm/25.0–35.0 nm in long period.

Examples 17 through 31

The raw yarns used in the following Examples 17 through 31 were the following yarns obtained by melt-spinning polyethylene terephthalate.
(1) An undrawn yarn of 275 deniers and 96 filaments, taken up at 1500 m/min
(2) A POY of 187 deniers and 24 filaments, taken up at 3100 min/min
(3) A drawn yarn of 98 deniers and 24 filaments obtained by thermal drawing a POY taken up at 3100 m/min, to 1.8 times The raw yarns of (1) and (3) are comparative examples.

Example 17

The polyester yarns obtained by spinning under the respective conditions of (1), (2) and (3) without being heat-treated at least at the second order transition temperature were used, to form ground fabrics for the covers around shoulder pads, and also to form shoulder pads to be used for production of clothes, and they were heat-treated at 185° C. while they were held in a certain shape to form an outward protrusion. The shoulder pads obtained by using the samples of (2) were far better than those of (1) and (3).

Example 18

The polyester yarns obtained by spinning under the respective conditions of (1), (2) and (3) without being heat-treated at not lower than the second order transition temperature were used as the weft or warp respectively, and a spun wool yarn of 40 in yarn number count was used as the warp or weft, to form collar interlining cloths. They were shaped to have a surface curved to form a protrusion in one direction, and heat-treated at 185° C. while they were held in a certain shape to form an outward protrusion. The collar interlining cloths obtained by using the samples of (2) were far better than those of (1) and (3).

Example 19

The polyester yarns obtained by spinning under the respective conditions of (1), (2) and (3) without being heat-treated at not lower than the second order transition temperature were used to form body interlining cloths (including collar interlining cloths). They were shaped to have a surface curved to form a protrusion in one direction, and heat-treated at 185° C. while they were kept in a certain shape to form an outward protrusion. The body interlining cloths obtained by using the samples of (2) were far better than those of (1) and (3).

Example 20

The polyester yarns obtained by spinning under the respective conditions of (1), (2) and (3) without being heat-treated at not lower than the second order transition temperature were used as the weft of a breast interlining cloth respectively, and a cotton yarn of 40 in yarn number count was used as the warp, to form interlining cloths made of union cloth. The interlining cloths were shaped to have a surface curved to form a protrusion in the horizontal direction, and while they were held in a certain shape to form an outward protrusion, they were heat-treated at not lower than 180° C. The breast interlining cloths obtained by using the samples of (2) were far better than those of (1) and (3).

Example 21

The polyester yarns obtained by spinning under the respective conditions of (1), (2) and (3) without being heat-treated at not lower than the second order transition temperature were used alone or together with another fiber respectively, to form woven fabrics, knitted fabrics and nonwoven fabrics. They were crease-processed, and subsequently heat-treated at 185° C. The crease-processed fabrics obtained by using the samples of (2) were far better than those of (1) and (3).

Example 22

The polyester yarns obtained by spinning under the respective conditions of (1), (2) and (3) without being heat-treated at not lower than the second order transition temperature were used alone or together with another fiber respectively, to form crimped fibers. They were subsequently heat-treated at 175° C. The crimped fibers obtained by using the samples of (2) were far better than those of (1) and (3).

Example 23

The polyester yarns obtained by spinning under the respective conditions of (1), (2) and (3) without being heat-treated at not lower than the second order transition temperature were used alone or together with another fiber respectively, and without being drawn, they were heat-treated once at not lower than 180° C. in a constrained condition or loose condition, and then re-drawn. Fibers obtained by using the samples of (2) were far higher in shrinking stress than those of (1) and (3).

Example 24

The polyester yarns obtained by spinning under the respective conditions of (1), (2) and (3) without being heat-treated at not lower than the second order transition temperature were used alone or together with another fiber respectively, and without being drawn, they were crimped, cut like staple fibers, spun, and then woven or knitted. The respective fabrics were heat-treated at 180° C. in a constrained or loose condition. The woven fabrics and knitted fabrics using the spun yarns of the samples of (2) were far better in shape stability and resilient elasticity than those of (1) and (3).

Example 25

The polyester yarns obtained by spinning under the respective conditions of (1), (2) and (3) without being heat-treated at not lower than the second order transition temperature were used alone or together with another fiber respectively, and without being drawn, they were crimped, and cut into staple fibers. The staple fibers using the spun yarns of the samples of (2) were suitable for producing woven fabrics and knitted fabrics far better in shape stability and resilient elasticity than those of (1) and (3).

Example 26

The polyester yarns obtained by spinning under the respective conditions of (1), (2) and (3) without being heat-treated at not lower than the second order transition temperature were used alone or together with another fiber respectively, and without being drawn, they were crimped, cut like staple fibers, mix-spun with 40% cotton, and then woven or knitted. The fabrics were sewn into shirts and heat-treated at 180° C. The shirts using the spun yarns of the samples of (2) were far better in shape stability and resilient elasticity than those of (1) and (3).

Example 27

The polyester yarns obtained by spinning under the respective conditions of (1), (2) and (3) without being heat-treated at not lower than the second order transition temperature were used alone or together with another fiber respectively, and without being drawn, they were knitted, and formed into headgear bodies. The headgear bodies were then heat-treated at 180° C. or more. The headgear bodies using the spun yarns of the samples of (2) were far better in shape stability and resilient elasticity than those of (1) and (3).

Example 28

The polyester yarns obtained by spinning under the respective conditions of (1), (2) and (3) without being heat-treated at not lower than the second order transition temperature were used alone or together with other fibers, and without being thermally drawn, they were crimped and formed into carpets. The carpets were heat-treated at 140° C. or more. The carpets obtained by using the samples of (2) were far better in shape stability and resilient elasticity than those of (1) and (3).

Example 29

The polyester yarns obtained by spinning under the respective conditions of (1), (2) and (3) without being heat-treated at not lower than the second order transition temperature were used alone or together with other fibers, and without being thermally drawn, they were formed into air bags. The air bags were heat-treated at 140° C. or more. The air bags obtained by using the samples of (2) were far better in swelling performance and air tightness than those of (1) and (3).

Example 30

The polyester yarns obtained by spinning under the respective conditions of (1), (2) and (3) without being heat-treated at not lower than the second order transition temperature were used alone or together with other fibers, and without being thermally drawn, they were formed into woven fabrics, knitted fabrics and braids. They were cut to obtain cords of 5 mm in diameter, and they were continuously heat-treated. Cords obtained by using the samples (2) were far better in hard elasticity than those of (1) and (3).

Example 31

The polyester yarns obtained by spinning under the respective conditions of (1), (2) and (3) without being heat-treated at not lower than the second order transition temperature were used alone or together with another fiber respectively, and without being drawn, they were crimped, and cut into staple fibers. The staple fibers using the spun yarns of the samples of (2) were suitable for producing woven fabrics and knitted fabrics far better in shape stability and resilient elasticity than those of (1) and (3).

The properties of the fibers and products obtained after heat treatment in Examples 17 through 31 were examined and found to be as follows:

(1) Specific gravity: 1.350 to 1.385
(2) crystal sizes obtained based on wide-angle X-ray diffraction measurement: 25–38 $A_1$ at Miller index (010), 20–38 $a_1$ at Miller index (100), and 20–38 A at Miller index ($\overline{1}$05)
(3) Degree of crystal orientation obtained based on wide-angle X-ray diffraction measurement: 58 to 85%
(4) Scattering image obtained by small-angle X-ray scattering photography: 4-point image
(5) Eirefringence; $55-120\times10^{-3}$
(6) Amorphous orientation by polarized fluorescence method; 0.088 to 0.350
(7) Long period: Dm/De=100–125 $A_1$/250–350 $A_1$

Example 31

Polyethylene terephthalate (IV=0.68) was melt-spun at a spinning temperature of 285° C. at a take-up speed of 3000 m/min, to obtain a raw yarn 1 of 200 deniers and 24 filaments. The raw yarn 1 was 2.8 g/d in breaking strength, 175% in elongation at break, 0.6 g/d in yield point, and 50% in elongation at the end point of the natural draw range. The raw yarn 1 was twisted by 200 T/m, to obtain a raw yarn 2.

The raw yarn 2 was used to form a plain weave fabric of warp×weft=40×40 (yarns/inch), and it was heat-treated in 75° C. water for 1 minute, to achieve warp×weft=60×60 (yarns/inch) for obtaining an interlining cloth A1. The yarn of the interlining cloth A1 was 0.5 g/d in yield point and 130% in elongation at the end point of the natural draw range.

A drawn regular polyester yarn of 200 T/m in the count of twist, 300 deniers, 24 filaments, 5 g/d in breaking strength, and 15% in elongation at break was used as the warp, and the raw yarn 2 was used as the weft, to prepare a plain weave fabric of warp×weft=40×60 (yarns/inch), and it was heat-treated in 75° C. water for 1 minute, to achieve warp×weft=60×60 (yarns/inch), for obtaining an interlining cloth B2.

The above-mentioned drawn regular polyester yarn of 200 T/m in twist count, 300 deniers, and 24 filaments was used to prepare a plain weave fabric of warp×weft=60×60 (yarns/inch), and it was heat-treated in 75° C. water for 1 minute, to achieve warp×weft=60×60 (yarns/inch), for obtaining an interlining cloth C1.

The interlining cloth A1 was heat-treated in a dry heat oven at 180° C. for 5 minutes to obtain an interlining cloth A2.

The interlining cloth B1 was heat-treated in a dry heat oven at 180° C. for 5 minutes to obtain an interlining cloth B2.

The interlining cloth C1 was heat-treated in a dry heat oven at 180° C. for 5 minutes to obtain an interlining cloth C2.

The interlining cloth A1 of 20 cm×20 cm was folded double in the warp direction, and held between two iron sheets of 22 cm×12 cm and 1.5 kg preheated to 180° C., without being pressed out of the iron sheets, and heat-treated in a dry heat oven at 180° C. or 5 minutes, to obtain an interlining cloth A1L.

The interlining cloth A2 of 20 cm×20 cm was folded double in the warp direction, and held between two iron sheets of 22 cm×12 cm and 1.5 kg preheated to 180° C., without being pressed out of the iron sheets, and heat-treated in a dry heat oven at 180° C. for 5 minutes, to obtain an interlining cloth A2L.

The interlining cloth B1 of 20 cm×20 cm was folded double in the warp direction, and held between two iron sheets of 22 cm×12 cm and 1.5 kg preheated to 180° C., without being pressed out of the iron sheets, and heat-treated in a dry heat oven at 180° C. for 5 minutes, to obtain an interlining cloth E1L.

The interlining cloth E1 of 20 cm×20 cm was folded double in the weft direction, and held between two iron sheets of 22 cm×12 cm and 1.5 kg preheated to 180° C., without being pressed out of the iron sheets, and heat-treated in a dry heat oven at 180° C. for 5 minutes, to obtain an interlining cloth B1T.

The interlining cloth B2 of 20 cm×20 cm was folded double in the warp direction, and held between two iron sheets of 22 cm×12 cm and 1.5 kg preheated to 180° C., without being pressed out of the iron sheets, and heat-treated in a dry heat oven at 180° C. for 5 minutes, to obtain an interlining cloth B2L.

The interlining cloth E2 of 20 cm×20 cm was folded double in the weft direction, and held between two iron sheets of 22 cm×12 cm and 1.5 kg preheated to 180° C., without being pressed out of the iron sheets, and heat-treated in a dry heat oven at 180° C. for 5 minutes, to obtain an interlining cloth B2T.

The interlining cloth C1 of 20 cm×20 cm was folded double in the warp direction, and held between two iron sheets of 22 cm×12 cm and 1.5 kg preheated to 180° C., without being pressed out of the iron sheets, and heat-treated in a dry heat oven at 180° C. for 5 minutes, to obtain an interlining cloth C1T.

The interlining cloth C2 of 20 cm×20 cm was folded double in the warp direction, and held between two iron sheets of 22 cm×12 cm and 1.5 kg preheated to 180° C., without being pressed out of the iron sheets, and heat-treated in a dry heat oven at 180° C. for 5 minutes, to obtain an interlining cloth C2T.

A shirt using the interlining cloth A1 as its collar interlining cloth was sewn, fitted in a mold, and heat-treated in a dry heat oven at 180° C. for 5 minutes, to obtain a shirt A1S.

A shirt using the interlining cloth A2 as its collar interlining cloth was sewn, to obtain a shirt A2S.

The shirt A2S was fitted in a mold and heat-treated in a dry heat oven at 180° C. for 5 minutes, to obtain a shirt A2S2.

A shirt using the interlining cloth C1 as its collar interlining cloth was sewn, fitted in a mold, and heat-treated in a dry heat oven at 180° C. for 5 minutes, to obtain a shirt C1S.

A shirt using the interlining cloth C2 as its collar interlining cloth was sewn, to obtain a shirt C2S.

The shirt C2S was fitted in a mold and heat-treated in a dry heat oven at 180° C. for 5 minutes, to obtain a shirt C2S2.

A coat using the interlining cloth B1 as its front body interlining cloth was sewn, and heat-treated in a dry heat oven at 10° C. for 5 minutes, to obtain a coat B1J.

A coat using the interlining cloth B2 as its front body interlining cloth was sewn to obtain a coat B2J.

The coat B2J was fitted in a mold and heat-treated in a dry heat oven at 180° C. for 5 minutes, to obtain a coat B2J2.

A coat using the interlining cloth C1 as its front body interlining cloth was sewn, and heat-treated in a dry heat oven at 180° C. for 5 minutes, to obtain a coat C1J.

A coat using the interlining cloth C2 as its front body interlining cloth was sewn to obtain a coat C2J.

The coat C2J was fitted in a mold and heat-treated in a dry heat oven at 180° C. for 5 minutes, to obtain a coat C2J2.

The respective properties were evaluated according to the following methods. (Criterion: ○ . . . very good Δ . . . good × . . . poor)

A. Evaluation of Resilience

A 20 cm×20 cm sample was washed by a household washing machine once, and fixed at a 1 cm wide portion on one side of it, onto a plate placed perpendicular to the floor surface. By a functional test, the resilience of the fabric was evaluated. The result is shown in Table 4.

B. Evaluation of Shape Retainability

A sample was washed by a household washing machine once, and evaluated by a functional test in reference to the fold remaining on the sample (the stronger the fold, the better the shape retainability), The result is shown in Table 5.

C. Evaluation of Sewability

A 20 cm×20 cm sample was folded by 1 cm on one side of it, and sewn straight by a household sewing machine, for a functional test. The result is shown in Table 6.

D. Evaluation of Shirt

A sample was washed by a household sewing machine once, and the collar was evaluated as a functional test. The result is shown in Table 7.

E. Evaluation of Coat

A sample was dry-cleaned once, and evaluated as a functional test. The result is shown in Table 8.

Industrial Applicability

Since the polyester product of the present invention is excellent in resiliency, elastic property, shape stability and shape retainability, it can be effectively used in areas where those properties are required. For example, it can be used suitably for clothes as the frontal base fabric, interlining cloth and lining of clothing, a shirt, brassiere, pad, blouse, blazer, coat, blouson, water-repellent wear, sports wear, under short pants, part of diaper, hosiery, and fluff-raised fabric, and also in industrial area, interior area and exterior area as net, artificial lawn, curtain, mat, printing ribbon, printing tape, flag, brush, umbrella fabric, etc., and also as civil engineering article, agricultural article, fishery article, medical article, etc.

TABLE 1

| Sample | Degree of crystal orientation (%) | Crystal sizes (nm) 010 | 100 | 105 | Small-angle X-ray scattering image | Long period (nm) |
|---|---|---|---|---|---|---|
| Non-treated undrawn yarn | — | — | — | — | — | — |
| Heat-treated undrawn yarn | 53 | 2.6 | 2.9 | — | Annular image | J = 12.6 |
| Non-treated specific POY | 57 | 1.5 | 1.6 | 1.6 | — | — |
| Heat-treated specific POY(1) | 81 | 2.8 | 3.1 | 3.1 | 4-point image | Dm/De = 11.4/30.8 |
| Heat-treated specific POY(2) | 66 | 2.8 | 2.7 | 2.1 | 2-point image | J = 10.0 |
| Non treated drawn yarn | 87 | 2.2 | 2.5 | 4.1 | 4-point image | Dm/De = 15.4/7.7 |
| Heat-treated drawn yarn | 93 | 4.6 | 3.8 | 5.2 | 4-point image | Dm/De = 11.9/12.1 |

TABLE 2

| Sample | Tensile strength (g/d) | Shape stability | Shape retainability | Resilient elasticity |
|---|---|---|---|---|
| Undrawn yarn | 0.4 | good | Poor | Poor |
| Heat-treated specific POY(1) | 2.4 | good | good | good |
| Heat-treated specific POY(2) | 0.9 | good | good | good |
| Heat-treated drawn yarn | 4.9 | poor | poor | excellent |

TABLE 3

| Sample | Specific gravity | Birefringence (x10⁻³) | Amorphous orientation |
|---|---|---|---|
| Non-treated undrawn yarn | 1.341 | 9 | 0.094 |
| Heat-treated undrawn yarn | 1.377 | Unmeasurable | 0.073 |
| Non-treated specific POY | 1.342 | 33 | 0.239 |
| Heat-treated specific POY (1) | 1.381 | 75 | 0.179 |
| Heat-treated specific POY (2) | 1.383 | unmeasurable | 0.107 |
| Non-treated drawn yarn | 1.362 | 140 | 0.547 |
| Heat-treated drawn yarn | 1.388 | 163 | 0.553 |

TABLE 4

| | Resiliency | |
|---|---|---|
| | Warp direction | Weft direction |
| Interlining cloth A1 | X | X |
| Interlining cloth B1 | X | X |
| Interlining cloth A2 | ○ | ○ |
| Interlining cloth B2 | X | ○ |
| Interlining cloth C2 | X | X |
| Interlining cloth C2 | X | X |

TABLE 5

| | Shape retainability |
|---|---|
| Interlining cloth A1L | ○ |
| Interlining cloth A2L | X |
| Interlining cloth B1L | Δ |
| Interlining cloth B1T | ○ |
| Interlining cloth B2L | Δ |
| Interlining cloth B2T | X |
| Interlining cloth C1T | Δ |
| Interlining cloth C2T | Δ |

TABLE 6

| | Resiliency | |
|---|---|---|
| | Warp direction | Weft direction |
| Interlining cloth A1 | ○ | ○ |
| Interlining cloth B1 | ○ | ○ |
| Interlining cloth A2 | X | X |
| Interlining cloth B2 | ○ | X |
| Interlining cloth C1 | ○ | ○ |
| Interlining cloth C2 | ○ | ○ |

TABLE 7

| | Resilience | Shape |
|---|---|---|
| A1S | ○ | ○ |
| A2S | ○ | Δ |
| A2S2 | ○ | Δ |
| C1S | X | X |
| C2S | X | X |
| C2S2 | X | X |

TABLE 8

| | Resilience | Shape |
|---|---|---|
| B1J | ○ | ○ |
| B2J | ○ | Δ |
| B2J2 | ○ | Δ |
| C1J | X | X |
| C2J | X | X |
| C2J2 | X | X |

What is claimed is:

1. A process for producing a polyester product comprising:
    preparing polyester fibers by melt-spinning at a take-up speed of 2500 m/min to 3500 m/min;
    heat treating the polyester fibers at a temperature of 60° C. to 120° C., as a first step; and
    further heat-treating the product at a temperature of 140° C. or more and not more than the melting point of the polyester, as a second step with the product maintained in a loose or constrained condition without being drawn in either of the first and second steps.

2. A process for producing a polyester product as described in claim 1, wherein said second step is performed on a product with a three-dimensional curved shape maintained in a constrained condition.

3. A process according to claim 1 wherein the product comprises polyester fibers which have a yield point and a natural draw range such as to allow said polyester fibers to be elongated at a stress within a range lower than the stress of the yield point and have an elongation of the natural draw range of less than 100%.

4. A process according to claim 1, wherein said polyester fiber is a conjugate fiber comprising polyethylene terephthalate, polybutylene terephthalate, or a polyester copolymer thereof as the main component, and a polystyrene based polymer, or a polyester polymer obtained by adding boric acid or a boron compound to polyethylene terephthalate, polybutylene terephthalate, or a polyester copolymer thereof as the other component.

5. A process according to claim 1, wherein a heated roll is used for performing said heat treatment.

6. A process according to claim 1, wherein heated air is used for performing said heat treatment.

7. A process according to claim 1, wherein heat treating is preceded by knitting said polyester fibers and followed by disassembling the resulting fabric.

8. A process according to claim 1, wherein the intrinsic viscosity of said polyester (in orthochlorophenol at 30° C.) is 0.55 to 1.00.

9. A polyester fiber product which satisfies the following conditions (1) to (4):
   (1) 1.350 to 1.385 in specific gravity,
   (2) 2.0 nm to 4.0 nm at Miller index (010), 2.3 nm to 4.0 nm at Miller index (100), and 1.5 nm to 4.2 nm at Miller index (105), as crystal sizes obtained by wide-angle X-ray diffraction measurement,
   (3) 58 % to 85 % in the degree of crystal orientation obtained by wide-angle X-ray diffraction measurement,
   (4) 0.088 to 0.450 in the amorphous orientation by polarized fluorescence method.

10. A polyester fiber product according to claim 9 which comprises a 4-point pattern in the scattering image obtained by a small-angle X-ray scattering photo, which has a Dm value of 8 nm to 15 nm for one unit period of crystal lattice/non-crystal lattice in the fiber axis direction of the long period determined from said photo, and has a De value of 20 nm to 35 nm for one unit period of crystal lattice/non-crystal lattice in the cross-sectional direction of the fiber, and has a birefringence of $50 \times 10^{-3}$ to $120 \times 10^{-3}$.

11. A polyester fiber product according to claim 9 which has a layer-line 2-point pattern in the scattering image obtained by a small-angle X-ray scattering photo, which has a J value of 15 nm or less, said J value being obtained from the following equation $$J = \lambda/2 \sin[\{\tan^{-1}(r/R)\}/2],$$

where r is the distance from the meridian or equator to the center of the scattering image on said photo.

12. A polyester fiber product according to claim 9 which has a 4-point pattern in the scattering image obtained by a small-angle X-ray scattering photo, which has a Dm value of less than 14 nm for one unit period of crystal lattice/non-crystal lattice in the fiber axis direction of the long period determined from said photo, and has a De value of 18 nm or more for one unit period of crystal lattice/non-crystal lattice in the cross-sectional direction of the fiber, and has a birefringence of $50 \times 10^{-3}$ to $120 \times 10^{-3}$.

13. A polyester fiber product as defined in claim 9, wherein the intrinsic viscosity of the polyester (in orthochlorophenol at 30° C.) is 0.55 to 1.00.

14. A yarn obtained by uniting fibers as defined in claim 9, with at least one kind of fiber selected from the group consisting of drawn polyethylene terephthalate based fiber, regenerated cellulose fiber, cotton, hemp, wool, acetate, polyamide fiber, aramid fiber, and silk, by combined mixing and twisting, twisting, mixing, conjugating, mix-texturing, mix-spinning or covering.

15. A fibrous sheet formed of a woven fabric, knitted fabric, nonwoven fabric, paper-like sheet or net-like sheet of a fiber obtained by conjugating or mixing the polyester fiber defined in claim 9, and at least one fiber selected from the group consisting of drawn polyethylene terephthalate, regenerated cellulose, cotton, hemp, wool, animal hair, acetate, polyamide, acrylic, polyurethane, aramid, and silk.

16. An interlining cloth comprising a woven fabric or knitted fabric formed of a fiber comprising a polyester fiber as defined in claim 9, in which said fiber comprising a polyester fiber has a twist count of 800 T/m or less.

17. A pad comprising a woven fabric or knitted fabric formed of a fiber comprising the polyester fiber defined in claim 9, in which said fiber comprising a polyester fiber has a twist-count of 800 T/m or less.

18. A shoulder pad comprising polyester fibers according to claim 9, wherein the fibers are arranged in the shape of the shoulder pad.

19. An interlining cloth comprising polyester fibers according to claim 9 wherein said polyester fibers are maintained in a curved shape to form a protrusion in one direction.

20. The interlining cloth as defined in claim 19, wherein said fibers are present as weft or warp.

21. An inside belt comprising polyester fibers according to claim 9, wherein the fibers are heat treated after forming the inside belt.

22. An interlining cloth produced in accordance with claim 19, wherein said polyester fibers are present as warp, and other fibers present as weft.

23. A crease-processed fabric comprising polyester fibers according to claim 9, wherein a heat treatment step is carried out after crease-processing.

24. A crimped fiber yarn comprising polyester fibers according to claim 9, wherein a heat treatment step is carried out after forming a crimped fiber.

25. A spun yarn comprising polyester fibers according to claim 9, wherein a heat treatment step is carried out after forming the spun yarn.

26. A woven fabric comprising polyester fibers according to claim 9, wherein a heat treatment step is carried out after forming a spun yarn of the woven fabric.

27. A knitted fabric comprising polyester fibers according to claim 9, wherein a heat treatment step is carried out after knitting.

28. A staple fiber produced by a process according to claim 9, wherein the polyester fibers are crimped without drawing, and are subsequently cut into the staple fiber.

29. A shirt comprising polyester fibers according to claim 9, formed by weaving or knitting spun yarns of the polyester fibers into a fabric, sewing said fabric to form the shirt, and thereafter performing a heat treatment.

30. Headgear comprising polyester fibers according to claim 9, produced by forming a knitted fabric from the polyester fibers, forming said fabric into headgear, and then performing a heat treatment.

31. A carpet comprising polyester fibers according to claim 9, produced by crimping the fibers, forming said fibers into a carpet, and then performing a heat treatment step.

32. An air bag comprising polyester fibers according to claim 9, weaving yarns of the polyester fibers into a woven cloth, sewing the woven cloth to form an airbag, and then performing a heat treatment.

33. A cord comprising polyester fibers according to claim 9, wherein said cord is produced by forming a woven fabric, knitted fabric, braid or nonwoven fabric, cutting said woven fabric, knitted fabric, braid or nonwoven fabric into a cord, and then performing a heat treatment.

* * * * *